(12) United States Patent
Shridhar et al.

(10) Patent No.: US 9,111,047 B1
(45) Date of Patent: Aug. 18, 2015

(54) METHOD, SYSTEM, AND COMPUTER PROGRAM PRODUCT FOR IMPLEMENTING FIRMWARE-DRIVEN, DYNAMICALLY CONFIGURABLE PULSE-DENSITY MODULATION AUDIO INTELLECTUAL PROPERTY

(71) Applicant: Cadence Design Systems, Inc., San Jose, CA (US)

(72) Inventors: Soman Manoj Shridhar, Pune (IN); Ghanekar Sachin Purushottam, Pune (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/229,783

(22) Filed: Mar. 28, 2014

Related U.S. Application Data

(60) Provisional application No. 61/969,817, filed on Mar. 24, 2014.

(51) Int. Cl.
*G06F 13/38* (2006.01)
*G06F 13/40* (2006.01)
*G06F 13/10* (2006.01)
*G06F 5/00* (2006.01)

(52) U.S. Cl.
CPC ............... *G06F 13/40* (2013.01); *G06F 13/10* (2013.01)

(58) Field of Classification Search
None
See application file for complete search history.

(56) References Cited

U.S. PATENT DOCUMENTS

| | | |
|---|---|---|
| 2003/0208723 A1 | 11/2003 | Killian et al. |
| 2005/0122244 A1* | 6/2005 | Hongoh et al. ............... 341/143 |
| 2008/0209181 A1 | 8/2008 | Petkov et al. |
| 2010/0287622 A1 | 11/2010 | Petkov et al. |
| 2012/0185808 A1 | 7/2012 | Petkov et al. |
| 2012/0195441 A1* | 8/2012 | Moon et al. ..................... 381/98 |

OTHER PUBLICATIONS

"HiFi 2 & HiFi EP Audio DSPs: The Proven Audio Architecture—From Mobile to DTV", Tensilica, Inc., Jan. 2012.
Lam, Chun Kit, et al. "Class-D Amplifier Power Stage With PWM Feedback Loop." Power Electronics, IEEE Transactions on 28.8 (2013): 3870-3881.

(Continued)

*Primary Examiner* — Scott Sun
(74) *Attorney, Agent, or Firm* — Vista IP Law Group, LLP

(57) ABSTRACT

A programmable intellectual property block includes a PWM processor core to perform audio processing on input audio signals with firmware-driven modules to generate PWM output samples without using digital-analog converters or application processors. PWM processor core directly writes PWM output samples to queues of PWM peripherals to generate and transmit PWM digital pulses used by power stage(s) to drive electroacoustic transducers. Audio processing module(s) and PWM processing module(s) are implemented as a part of the firmware stored on the programmable processor core and are co-optimized by accessing the firmware. PWM processor core is dynamically configurable by identifying appropriate modules or information from the firmware based at least in part upon optimization objectives. The programmable intellectual property block allows users to introduce custom-defined modules or changing the sequence of execution along the PWM path and may be configured based on user profile (s), system variable(s), and/or sensing different acoustic conditions.

38 Claims, 15 Drawing Sheets

(56) References Cited

OTHER PUBLICATIONS

Hacker, Scot. *MP3: The definitive guide*. Sebastopol, CA: O'Reilly, 2000 (Sample Chapter 2).
Cravotta, Robert, "Multiprocessing #5: Dataplane Processor Units", URL: http://www.edn.com/electronics-blogs/other/4307524/Multi-processing-5-Dataplane-Processor-Units, Jul. 14, 2009.
Pascaul, César, et al. "High-Fidelity PWM Inverter for Audio Amplification Based on Real-Time DSP." (2002).
Microtechnology, A. P. E. X. PWM Basics, pulse width modulator amplifier. vol. 30. Application Note, 1988.
Texas Instruments, "TAS5000 Digital Audio PWN Processor: Data Manual": Dec. 2000.
Texas Instruments, "TAS5504A 4-Channel Digital Audio PWN Processor: Data Manual", Feb. 2006.

* cited by examiner

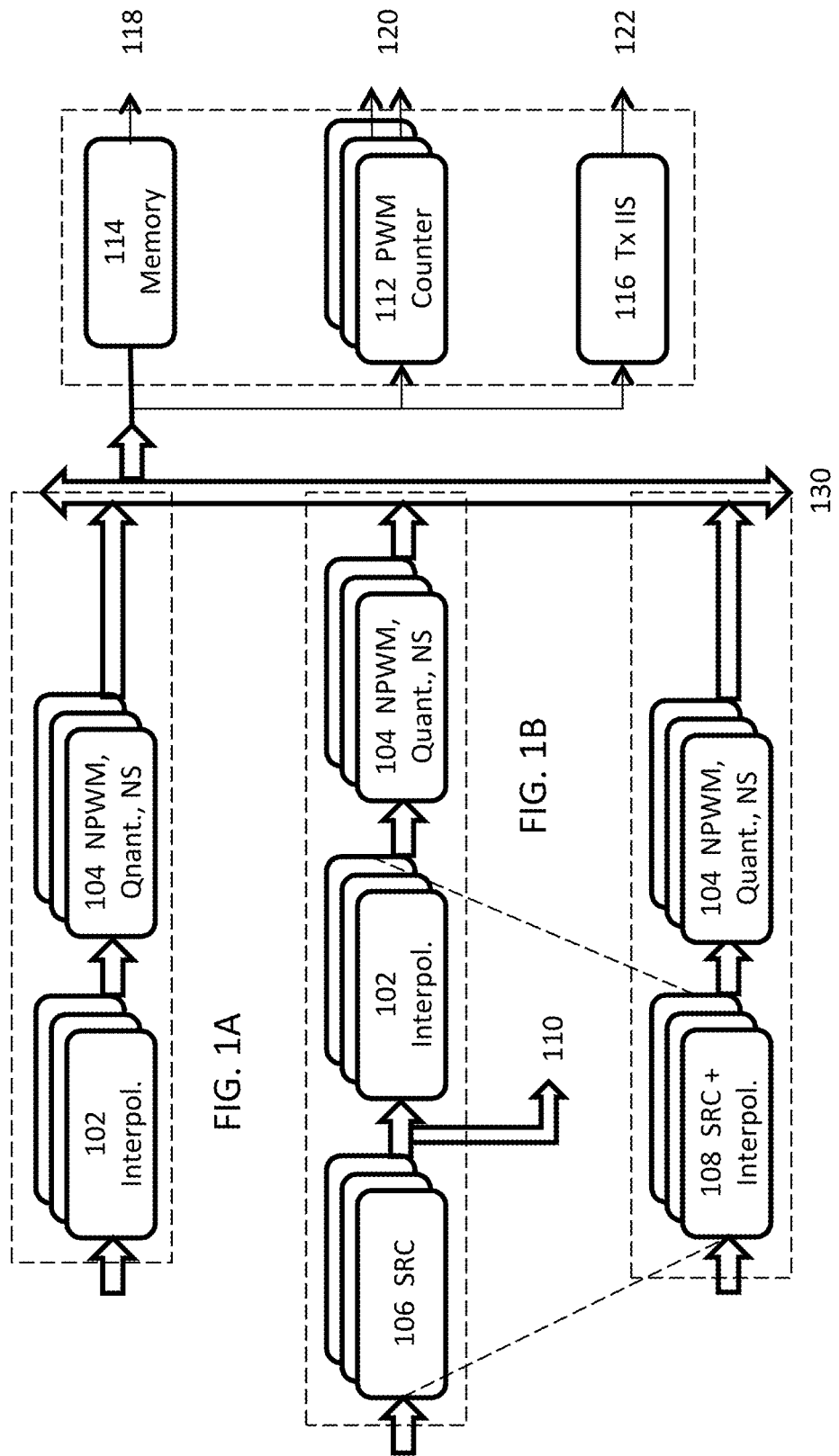

| DPU / DSP Core | Firmware | PWM Peripheral |
|---|---|---|
| Audio DSP | PWM Modules, Audio, Speech Library | Configurable No. of Channels |
| Custom Instructions | Multi-Rate Filter Stages | Configurable Input (bits / Channel) |
| Custom Configurations | One / More Variants of PWM, Quantization Algorithms, or Noise Shaping Algorithms | Configurable Directly Driving SRC PCM Output Thru IIS for External PWM Conversion for Stereo |
| Direct PWM Peripheral Interfaces | One or More Sample Rate Conversion (SRC) Stages | Configurable 1-bit / Channel for single-ended PWM Pulse Output OR 2-bit / Channel for Differential PWM Output |
| Configurable No. of PWM Output Ports | System Level EMI / AM Interference Reduction | Configurable FIFO Depth |
| Configurable PWM Peripheral Configurations | Co-optimized PWM & SRC Path(s) | Configurable Input Interface – Direct Data Interface Or Through Memory Interface |
| | Provisioning of User-Defined Modules | Configurable EMI Reduction Algorithms |
| | Multiple Audio DSPs / DPUs Support | Tri-Level Signaling |
| | Post Processing modules (e.g., EQ) | No. of IIS, IIC, Or GPIO Port |
| | Distortion / Environ. Correction Module(s) | |

FIG. 5

METHOD, SYSTEM, AND COMPUTER PROGRAM PRODUCT FOR IMPLEMENTING FIRMWARE-DRIVEN, DYNAMICALLY CONFIGURABLE PULSE-DENSITY MODULATION AUDIO INTELLECTUAL PROPERTY

CROSS REFERENCE TO RELATED APPLICATION(S)

This application claims the benefit of U.S. provisional patent application Ser. No. 61/969,817 entitled "METHOD, SYSTEM, AND COMPUTER PROGRAM PRODUCT FOR IMPLEMENTING FIRMWARE-DRIVEN, DYNAMICALLY CONFIGURABLE PULSE-DENSITY MODULATION AUDIO INTELLECTUAL PROPERTY" and filed on Mar. 24, 2014. The content of the aforementioned U.S. provisional patent application is expressly incorporated by reference for all purposes.

BACKGROUND

Pulse Width Modulator (PWM) approach is increasingly being used in audio devices, compared to more conventional approaches having class-AB/G power stages, because of several advantages such as higher power efficiency, longer battery operation, smaller form factors, and lower heat dissipation, etc. that are desirable for audio devices. Conventional PWM approaches include analog PWM and digital PWM. PWM audio has been shown to exhibit high power efficiency and thus low power consumption and low heat dissipation. As a result, PWM audio has found increasing applications in portable devices. Conventional PWM approaches uses digital-analog converter(s), hard-wired circuit audio processing and PWM processing blocks, or application processor(s) to perform the playback or recoding functions.

Given the advantages provided by the PWM approach, there exists a need for effective and efficient technique to implement PWM technologies.

SUMMARY

Disclosed are method(s), system(s), and article(s) of manufacture for implementing firmware-driven, dynamically configurable pulse-density modulation audio intellectual property in one or more embodiments.

Some embodiments are directed at a customizable processor such as a customizable digital signal processor or a customizable dataplane processor (collectively customizable processor). A customizable processor may include a PWM (or PDM) processor core to perform various audio processing tasks on input audio signals. The audio processing tasks include one or more of sample rate conversion, one or more interpolations, audio equalization, audio mixing, quantization, and noise shaping. The customizable processor may use one or more firmware-driven modules that are implemented as a part of the firmware stored on the customizable processor to generate PWM output samples. A customizable processor may perform various audio processing and PWM tasks without using digital-analog converters, application processors, or hardwired digital PWM logic in some of the embodiments described herein.

Some embodiments are directed at a method for implementing firmware-driven, dynamically configurable pulse-density modulation audio intellectual property. The method may receive an audio signal as an input to a customizable processor and perform one or more audio processing tasks on the audio signal to generate PDM (pulse-density modulation) samples by executing the appropriate PDM modules in the customizable processor. The PDM samples may be directly written to one or more PDM peripherals such as a FIFO (first-in-first-out) queue and a PDM counter via a configurable interface. Directly writing PDM samples to PDM peripherals without going through any third-party digital signal processors or application processors avoids exposing the audio data (e.g., PCM data) to these third-party processors and thus provides greater data security for the audio data. The method may further retime the PDM samples by using a first PDM peripheral such as a FIFO queue.

The method may further generate the actual PDM digital pulses from the retimed PDM samples by using a PDM counter and transmit the actual PDM digital pulses to one or more power stages that may be invoked by the method to drive one or more electroacoustic transducers such as one or more loudspeakers or headphones. Some embodiments are directed at a hardware module or system that may be invoked to perform any of the methods, processes, or sub-processes disclosed herein. The hardware system may include a customizable processor and firmware stored in some persistent memory on the customizable processor to perform any of the methods, processes, or sub-processes disclosed herein in some embodiments. The hardware system may further include one or more forms of non-transitory machine-readable storage media or devices to temporarily or persistently store various types of data or information such as the firmware. Some illustrative modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some illustrative forms of the non-transitory machine-readable storage media may also be found in the System Architecture Overview section below.

More details of various aspects of the methods, systems, or articles of manufacture for implementing firmware-driven, dynamically configurable pulse-density modulation audio intellectual property are described below with reference to FIGS. 1-6.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIGS. 1A-C illustrate three illustrative high level schematic block diagrams for a pulse-density modulation audio intellectual property block in some embodiments.

FIGS. 2B-1 and 2B-2 jointly illustrate a more detailed flow diagram of a process for implementing pulse-density modulation audio intellectual property block in some embodiments.

FIG. 5 illustrates variants or components of various modules for implementing a pulse-density modulation audio intellectual property block in some embodiments.

DETAILED DESCRIPTION

Figure 1D:
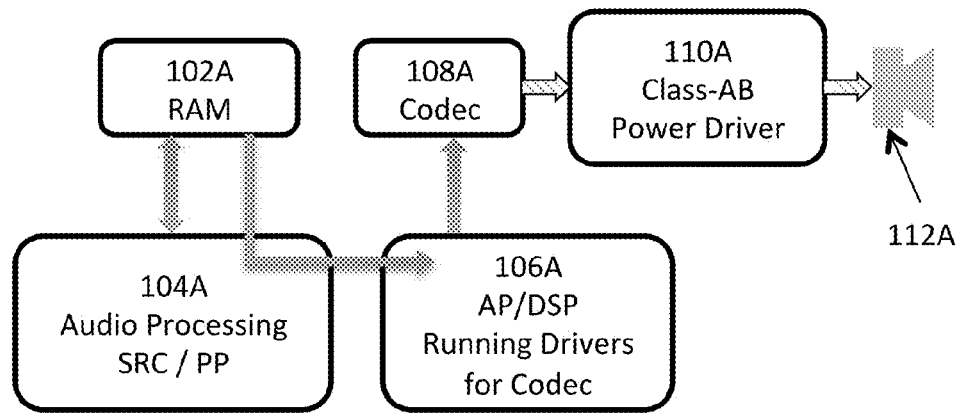
FIGS. 1D-E illustrate two illustrative high level schematic block diagrams illustrating data flows among various modules in audio devices.

Various embodiments of the invention are directed to a methods, systems, and articles of manufacture for implementing firmware-driven, dynamically configurable pulse-density modulation audio intellectual property. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Disclosed are method(s), system(s), and article(s) of manufacture for implementing firmware-driven, dynamically configurable pulse-density modulation audio intellectual property in one or more embodiments. Throughout this application, the terms "configurable", "customizable", and "programmable" are used interchangeably to reflect that the functionality of various modules, intellectual property blocks, processors, or processor cores may be modified, corrected, optimized, or improved at various time points. Some embodiments are directed at a method that receives an audio signal as an input to a customizable processor and performs one or more audio processing tasks on the audio signal to generate PDM samples by executing the appropriate PDM modules in the customizable processor. The PDM samples may be directly written to one or more PDM peripherals such as a FIFO (first-in-first out) queue and a PDM counter or a bit-width reduction module via a configurable interface to reduce data security or data contamination concerns. The method may further retime the PDM samples by using a first PDM peripheral such as a FIFO queue and may generate the actual PDM digital pulses from the retimed PDM samples by using a PDM counter and transmit the actual PDM digital pulses to one or more power stages that may be invoked by the method to drive one or more electroacoustic transducers such as one or more speakers. Each of the PDM counter the a bit-width reduction module may be implemented as a firmware driven module and thus may be implemented as a hardware module, a firmware module, or a combination thereof.

Some embodiments are directed at a customizable processor that may include a PWM (or PDM) processor core to perform various audio processing tasks on input audio signals. As PWM (pulse-density modulation) represents a special case and thus a subset of PDM (pulse-density modulation), the terms PWM and PDM are thus used interchangeably at least in some embodiments of this application. For example, the recitation of a PWM processor core may include the PDM processor core in these embodiments, and vice versa. Moreover, both a PWM processor core and a PDM processor may be generally referred to as a processor core. That is, a processor core may include, among other components, a PWM processor core or a PDM processor core. The input audio signals may include digital audio data in various formats including uncompressed audio formats, compressed lossless formats, and lossy compressed formats in some of these embodiments. The customizable processor may use one or more firmware-driven modules that are implemented as a part of the firmware stored on the customizable processor to generate PWM output samples. The customizable processor may further directly write the PWM output samples to the memory of one or more PWM peripherals to generate PWM digital pulses. The PWM digital pulses are further transmitted to one or more power stages that in turn drive one or more electroacoustic transducers such as one or more speakers. In some of the embodiments described herein, the customizable processor is fully digital at least as far as processing digital compressed or uncompressed input audio signals are concerned and thus requires no digital-analog converters. Directly writing PWM samples from the customizable processor core to one or more peripherals (e.g., PWM peripherals) also renders the use of application processors unnecessary. Implementing various audio processing modules and/or PWM processing modules as a part of the firmware also provides dynamic configurability as well as co-optimization to the customizable process, either during the design or planning stage or the post-fabrication stage.

The PWM processor may be dynamically configured to achieve one or more optimization objectives by identifying or invoking one or more appropriate modules, parameters, coefficients, or other suitable information from the firmware based at least in part upon the optimization objectives.

For example, the PWM processor may be dynamically configured by using information about the external application environment observed through one or more ports of the PWM processor in some embodiments. As a practical use example, the PWM processor may determine that the battery level powering the audio playback or recording device is low and refer to the firmware to dynamically invoke one or more less power-consuming firmware modules for the playback or recording so as to preserve the battery level for a longer period of time. As another practical use example, the PWM processor may refer to the firmware and be dynamically configured by using, for example but not limited to, the battery level, the quality of the input source signals (e.g., voice dialog or high-definition audio signals, etc.), or the ambience sounds of the listening environment in which the playback occurs, etc. As another practical use example, the PWM processor may be dynamically configured based at least in part upon, for example but not limited to, the feedback from one or more microphones or sensors capturing the ambience of the listening environment in which the playback occurs such that the PWM processor may refer to the firmware to dynamically adjust one or more modules (e.g., one or more audio equalization modules, etc.) or parameters or coefficients thereof to change, for example, the output levels of one or more channels in response to the listening environment where the playback occurs.

For instance, the PWM processor may examine the ambience and determine that the bass being reproduced may be enhanced due to possibly placement or misplacement of a subwoofer, that the reflection or absorption of certain sounds produced by one or more channels in the listening environment may be less than desired or further optimized in the captured ambience through one or more microphones or sensors in conjunction with an analog-digital converter, or that the ambience appears to introduce some noise affecting the playback or recording. The PWM processor may refer to the firmware to adjust the output levels to these one or more channels or to use a certain noise shaping module, one or more filters, or one or more parameters or coefficients thereof to improve the quality of playback in response to these characteristics of the listening environment. In these examples, the ambience includes the sounds in the listening environment. It shall be noted that whether or not the PWM processor is going to be dynamically configured or the extent or degree of such dynamic configuration may also be changed or selected by the users in some of the embodiments described in this application.

In addition or in the alternative, the PWM processor may also examine the ambience and determine that the harmonic distortion of the reproduced sound captured by one or more microphones or sensors may be improved by analyzing the total harmonic content (e.g., total harmonic distortion or THD) of the reproduced sound or the reproduced soundstage. In this example, the PWM processor may refer to the firmware to identify or invoke, for example, an appropriate noise shaping module, one or more different filters, or one or more filter coefficients to reduce the noise content in the total harmonic content, to improve the filtering of fundamental frequency, or to change one or more PWM processing modules in order to reduce the total harmonic distortion of the reproduced sound in the specific listening environment.

Some embodiments are directed at a method for implementing firmware-driven, dynamically configurable pulse-density modulation audio intellectual property. The method may receive an audio signal as an input to a customizable processor and perform one or more audio processing tasks on the audio signal to generate PDM samples by executing the appropriate PDM modules in the customizable processor. The PDM samples may be directly written to one or more PDM peripherals such as a FIFO queue and a PDM counter via a configurable interface. Directly writing PDM samples to PDM peripherals without going through any third-party digital signal processors or application processors avoids exposing the audio data such as PCM data to these third-party processors and thus provides greater data security for the audio data. The method may further retime the PDM samples by using a first PDM peripheral such as a FIFO queue. The method may further generate the actual PDM digital pulses from the retimed PDM samples by using a PDM counter and transmit the actual PDM digital pulses to one or more power stages that may be invoked by the method to drive one or more electroacoustic transducers such as one or more speakers or headphones.

FIGS. 1A-C illustrate three illustrative high level schematic block diagrams for pulse-density modulation audio intellectual property block in some embodiments. In some embodiments illustrated in FIG. 1A, the intellectual property block may be implemented as a hardware module including as a system on a chip (SOC) or a part thereof such as a digital signal processor (DSP), a data plane processor (DPU), or a part of a DSP or a DPU. A dataplane processor is a processor that may be implemented on a semiconductor substrate (e.g., a single crystal silicon wafer) and include a central processing unit (CPU), a processor core, or any part thereof as well as some custom logic (e.g., task specific, differentiating, or direct point-to-point interface(s), etc.) and/or one or more DSPs. The intellectual property block may further include some non-transitory memory to accommodate firmware that may be used to dynamically configure the intellectual property block, to enhance performance of the intellectual property block, to introduce new, post-fabrication or post-silicon functionalities to the intellectual property block without respins, to custom define IOs (inputs/outputs) by users, to mimic RTL-style (register transfer level) hardware data flows, or to fix one or more bugs in the intellectual property block.

In some embodiments, dynamically configuring a module, an intellectual property block, a processor, or a processor core includes modifying, improving, optimizing, or performing one or more fixes or corrections for a module, an intellectual property block, a processor, or a processor core at one or more time points. The one or more time points may include, for example, a first time point after the module, the intellectual property block, the processor core, or the processor has been manufactured. For example, an intellectual property block may be modified, improved, optimized, or corrected by updating the firmware stored thereupon. The one or more time points may include a second time point when a source or one or more characteristics (e.g., bit-depth or sampling rate of an audio input signal) of the input signal for processing are identified. For example, a processor may identify the source of an input signal as a high-definition audio source and dynamically invokes or loads one or more equalization modules to process the input audio signal. The one or more time points may include a third time point when a processor or a processor core is receiving or processing an input signal by invoking or loading one or more modules to process the input signal. For example, a processor may identify the input audio signal as a standard definition signal (e.g., 8-bit audio dialog) and dynamically invoke or load one or more less power consuming modules to process the input audio signal or disable one or more other modules such as an equalization module to reduce power consumption.

In some embodiments, one or more firmware modules may be loaded from the firmware at the time the device including an intellectual property block, a processor, or a processor core is powered up. The intellectual block, processor, or processor core may then invoke the appropriate modules In some other embodiments, the intellectual property block, the processor core, or the processor described herein may dynamically load or unload one or more firmware modules on the fly when the processor determines that the one or more firmware modules are needed or desired for processing certain signals. For example, a processor may receive feedback from a sensor for the battery level and load or unload one or more modules for processing signals based at least in part upon the battery level.

In some embodiments, the intellectual block may include the firmware together with one or more peripherals (e.g., one or more PWM peripherals) and one or more use-specified or custom designed interfaces to interface with an existing processor to provide dynamic configurability to the existing processor. The dynamic configurability may be realized in a variety of different ways including, for example but not limited to, updating the firmware to include desired modules, adding, removing, or modifying one or more parameters or coefficients of one or more modules, or reordering the sequence of execution of a plurality of modules. For example, dynamic configurability may be implemented by selecting one or more desired modules from a set of predefined variants of one or more modules, by introducing one or more custom- or user-defined parameters or modules as one or more candidate modules or candidate parameters, or any combinations thereof in some embodiments.

In some of these embodiments, a DPU, DSP, or an intellectual block (e.g., the pulse-density modulation audio intellectual property block) described herein does not use bus interfaces to transfer data and allows designers to completely bypass the bus architecture. Rather, a DPU, DSP, or an intellectual block described herein may use various peripheral interfaces such as one or more lookup interfaces, one or more custom defined, configurable ports, one or more configurable general-purpose input/output (GPIO) ports, one or more direct registered mapped input/output ports, or one or more designer-defined or instruction-accessible input/output FIFO (first-in-first-out) interfaces, etc. to accomplish data transfer among various modules described herein. An illustrative DPU may include various variants of the Xtensa LX DPU provided by Cadence Design Systems, Inc. of San Jose, Calif. More details about the hardware architecture of various intellectual property blocks will be described in subsequent paragraphs with reference to FIGS. 1A-G, 3, 4A-B, and 5.

FIG. 1A illustrates that the intellectual block may include one or more interpolators 102 (e.g., one or more 2×-interpolators) to change the input signal sampling frequency. The one or more interpolators 102 may receive signals from PCM signals from, for example, CD (compact disk) players, SACD (super audio compact disk) players, blu-ray audio players, DVD (digital versatile disk) players, or an external sample rate conversion (SRC) module, each transmitting input signals having various sampling frequencies. For example, the intellectual block illustrated in FIGS. 1A-C may include three 2×-interpolators to change the input signal sampling frequency from, for example, 48 kHz input PCM signals to 384 kHz or from 44.1 kHz to 352.8 kHz discrete-time signals.

The intellectual property block may further include a pulse-density modulator 104 such as a natural sampling pulse-width modulation (NPWM) module, a quantization module, or a noise shaping module to generate, for example, PWM duty cycle values or PWM output samples. The rectangular box in dashed lines surrounding the modules 102 and 104 indicate that both the modules 102 and 104 may be a DSP, a part of a DSP, or a part of a DPU and may reside in an SOC.

It shall be noted that unless otherwise specifically recited or claimed, the terms PWM and PDM (pulse-density modulation) may be used interchangeably although PDM refers to a generalized PWM. More specifically, in a PDM signal, specific amplitude values are not encoded into pulses of different size as these amplitude values may be in pulse-code modulation. Rather, it is the relative density of the pulses that corresponds to the underlying analog signal's amplitude. PWM represents a special case of PDM where all the pulses corresponding to one sample (e.g., a 8-bit PWM sample or duty cycle values) are contiguous in the digital signal.

One of the advantages of using, for example, firmware-driven PWM algorithm, quantization algorithm, or noise shaping algorithm is that these modules are not hard-wired in the intellectual product. Rather, these modules may be configured or updated anytime, and post-fabrication bug fixes may also be done. Another advantage of using firmware-driven modules such as the firmware-driven PWM algorithm, quantization algorithm, or noise shaping algorithm is that co-optimization among various modules may be performed. This advantage of co-optimization is in sharp contrast with conventional approaches. More details about co-optimization will be described in subsequent paragraphs with reference to FIGS. 2B and 2D.

In the embodiments illustrated in FIG. 1B, the intellectual block enclosed in the dashed-line rectangular box in FIG. 1B may include a sample rate conversion (SRC) module 106 that changes the sampling rate of a discrete-time signal (e.g., a PCM or pulse-code modulation, DSD or direct stream digital, DXD or Digital eXtreme Definition, or other suitable types of discrete-time signal) to obtain a new discrete-time representation of the underlying continuous-time signal. The SRC module 106 may receive analog or digital input signals and change the sampling rate of the input signal by using various known techniques such as the lowest common multiple technique. In some embodiments, the SRC module 106 may also output PCM (pulse-code modulated) signals 110.

In the embodiments illustrated in FIG. 1C, the intellectual block enclosed in the dashed-line rectangular box in FIG. 1C may include co-optimized sample rate conversion module and one or more interpolators 108 that are co-optimized either between the SRC component and the interpolation component or together with one or more other modules by using at least the firmware.

It shall be noted that the modules 102, 104, 106 and 108 of FIGS. 1A, 1B, and 1C may be implemented either as a hardware module with hard-wired circuitry, a software module, or a combination thereof. In some embodiments, the modules 102, 104, 106, and 108 may be implemented as a complete software process as a part of the firmware that is stored in a non-transitory persistent memory within a DSP, a part of a DSP, or a part of a DPU on an SOC. For example, the variants of the modules 102, 104, 106, and 108 may be stored in the firmware residing in the DSP, a part of a DSP, or a DPU on an SOC for dynamic configurability or co-optimization purposes.

The modules 102 and 104 of FIG. 1A, 102, 104, and 106 of FIG. 1B, or 104 and 108 of FIG. 1C may be implemented as a part of a PWM processor core, which may be a DSP, a part of a DSP, or a part of a DPU. These modules (102, 104, 106, and/or 108) in the PWM processor core may further interface with and function in conjunction with some peripherals such as PWM peripherals. These peripherals may include data memory 114 (e.g., memory with FIFO read registers, write registers, and control logic). The data memory 114 receives, for example, PWM output duty cycle values (e.g., 8-bit PWM/channel duty cycle values) from modules 102 and 104 and transmit the PWM output duty cycle values to a PWM counter 112 to generate PWM digital pulses that may be further transmitted to a power stage to drive, for example, electroacoustic transducers such as speakers 120. The data memory 112 may optionally transfer the PWM output duty cycle values to an IIS (inter-IC sound) serial interface to transmit the PWM output duty cycle values to an external PWM counter or to an external stereo PWM converter 122 in some of the embodiments illustrated in FIGS. 1A-C. In these embodiments, the PWM counter is not implemented as a part of the SOC on which the PWM processor core including the modules 102, 104, 106, and/or 108 resides. In some other embodiments, the data memory 114, the PWM counter 112, and the IIS interface 116 may also be implemented together with the PWM processor core as a part of the SOC.

Figure 1E:
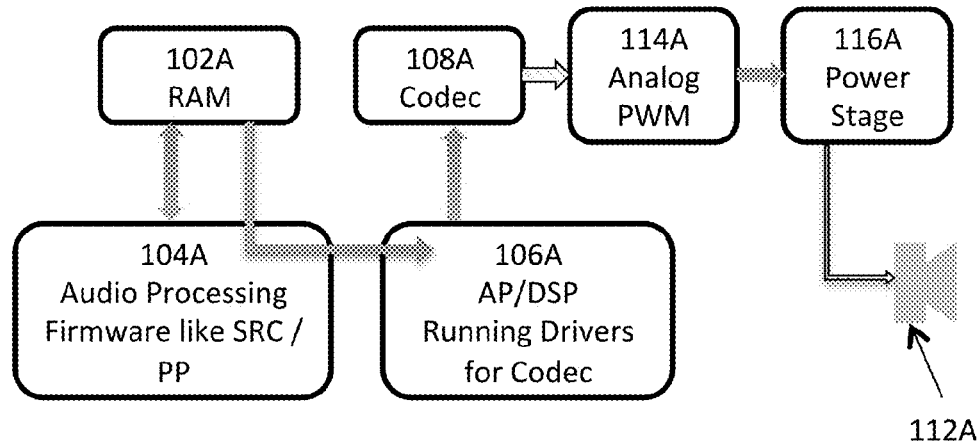

FIGS. 1D-E illustrate two illustrative high level schematic block diagrams illustrating data flows among various modules in audio devices. More specifically, FIG. 1D illustrates that the module 104A including an audio processing module and one or more post-processing modules generates and stores output samples in a DSP RAM (random access memory) 102A. The hardware codec 108A (a device for coding or decoding digital audio data streams) retrieves the output samples from the DSP RAM 102 through the application processor or DSP (digital signal processor) running drivers 106A for the hardware codec 108A. The hardware codec 108A generates and transmits output signals to, for example, a power driver 110A (e.g., a Class-AB power driver) that drives one or more speakers 112A. This particular implementation illustrated in FIG. 1D may exhibit high power consumption due to the use of the class-AB power driver and also due to high data transfer among the DSP or the application processor and the hardware codec. Co-optimization may also be impossible or impractical in this particular implementation because some of the audio post-processing tasks are spread across, for example, the hardware codec 108A and the DSP or application processor 106A.

FIG. 1E illustrates that the module 104A including an audio processing module and one or more post-processing modules generates and stores output samples in a DSP RAM (random access memory) 102A. The hardware codec 108A retrieves the output samples from the DSP RAM 102 through the application processor or DSP (digital signal processor) running drivers 106A for the hardware codec 108A. The hardware codec 108A generates and transmits output signals to, for example, an analog PWM module 114A that further transmit the PWM output signals to a power stage 116A (e.g., a class-D power stage) which in turn drives one or more speakers 112A. This particular implementation illustrated in FIG. 1E may exhibit the same disadvantages (e.g., high power consumption due to, for example, high data transfer between the DSP or the application processor and the hardware codec) as that illustrated in FIG. 1D for similar reasons. In addition, this particular implementation further exhibits data security issues because the PCM data transmitted to the application processor or DSP 106A from the DSP memory 102A is exposed to the third-party manufactured application processor or DSP 106A.

Figure 1F:
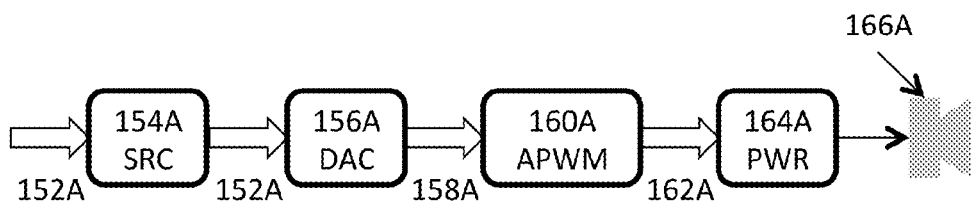
FIGS. 1F-G illustrate two more illustrative high level schematic block diagrams illustrating data flows among various modules in audio devices.
Figure 1G:
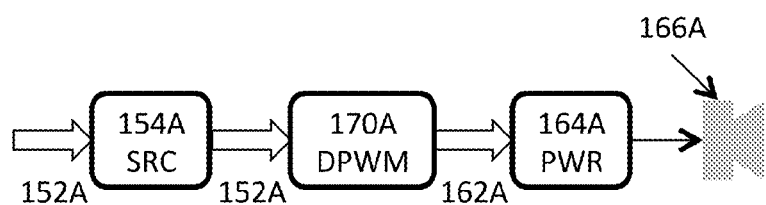

FIGS. 1F-G illustrate two more illustrative high level schematic block diagrams illustrating data flows among various modules in audio devices. In the illustrative example illustrated in FIG. 1F, a sample rate conversion module 154A receives input signal 152A (e.g., PCM signals), changes the sampling frequency of the input signal into a signal with a different sampling frequency, and transmits the signal with the different sampling frequency to a digital-analog conversion (DAC) module 156A. The digital-analog conversion module 156A converts the input signal 152A having the different sampling frequency into an analog signal 158A and transmits the analog signal 158A to, for example, an analog PWM (APWM) module 160A. The class-D PWM module 160A processes the input analog signal 158A to generate PWM pulses 162A (e.g., 1-bit/channel digital pulses) and transmits the PWM pulses 162A to a switch power stage 164A (PWR in FIGS. 1F-G) which drives one or more electroacoustic transducers 166A such as one or more stand-alone or integrated speakers.

When compared with the embodiments illustrated in FIGS. 1A-C, FIG. 1F illustrates an analog PWM implementation and thus requires the input in analog form and a digital-analog converter to convert the analog input into discrete-time, digital signals. In contrast, the embodiments illustrated in FIGS. 1A-C do not need any digital-analog converters and thus may be implemented as fully digital architecture and thus may be integrated as a part of a system on a chip.

In the example illustrated in FIG. 1G, the sample rate conversion module 154A may receive a discrete-time signal 152A, (e.g., PCM signals), changes the sampling frequency of the input signal into a signal with a different sampling frequency, and transmits the signal with the different sampling frequency to a digital-PWM module (DPWM) module 170A. The digital PWM module may include one or more interpolators, a pulse-width modulator, a quantizer, and a noise shaping module. The digital PWM module 170A may perform pulse-width modulation on the input signal 152A to generate digital PWM pulses (e.g., 1-bit/channel PWM pulses) and transmit the digital PWM pulses to a switch power stage 164A that in turn drives one or more electroacoustic transducers 166A.

When compared with the embodiments illustrated in the implementation illustrated in FIG. 1F, FIG. 1G illustrates a digital PWM implementation. The digital PWM implementation is fully digital and thus does not require a digital-analog converter to convert digital audio data into analog form for the analog PWM module 160A. In addition or in the alternative, the fully digital PWM implementation as illustrated in various other figures and described in the remainder of this application may be implemented as open-loop PWM, whose total harmonic distortion or signal-to-noise ratio is usually limited by the power stage, or as closed-loop PWM, which has more complex architecture yet provides better audio quality than open-loop PWM and provide analog or digital corrections of the power stage to further improve the total harmonic distortion or signal-to-noise ratio. With open-loop PWM devices, the harmonic distortion in the playback signals may be caused by, for example, supply voltage fluctuations in the power stages or the non-linearity of the PWM stage or the speaker system. In these devices, the power stage supply voltage fluctuations or the actual signals transmitted to the speaker system may be identified with one or more sensors through an analog-to-digital converter and transmitted to a receiving port of the PWM processor. The PWM processor may further invoke one or more appropriate firmware modules (e.g., a closed-loop PWM) to compensate for or reduce the harmonic distortion by using the received data to render higher fidelity audio.

In systems having a separate PWM and DAC module such as those illustrated in FIG. 1F, the sample rate conversion module 154A translates the input signal into, for example, 48 kHz signal for subsequent PWM tasks. For input signals having sampling frequencies higher than 48 kHz (e.g., 96 kHz or 192 kHz linear PCM signals for high fidelity pure audio or 2.8224 MHz input signals for super audio CD, etc.), the sample rate converter 152A requires intensive computation intensive decimation or downsampling to reduce the sampling rate of the input signal. Moreover, the sample rate conversion module may need poly-phase re-sampler module for conversion between 44.1 kHz frequency domain and 48 kHz frequency domain. These computation intensive decimation and re-sampler may be completely avoided by using the embodiments illustrated in FIGS. 1A-C including the co-optimized firmware-driven PWM and firmware-driven SRC and interpolators.

For example, the co-optimized firmware driven SRC (e.g., 108) and the firmware driven PWM (e.g., 104) need not perform the computation intensive down-sampling or some of the interpolations when the input signal has a 96 kHz sampling rate can be processed by two 2×-interpolators to change its sampling rate to 384 kHz. As another example, the co-optimized firmware driven SRC (e.g., 108) and the firmware driven PWM (e.g., 104) need not perform the computation intensive down-sampling or some of the interpolations when the input signal has a 192 kHz sampling rate can be processed by one 2×-interpolator to change its sampling rate to 384 kHz. The decimation or down-sampling is completely avoided. Another advantage of the firmware-driven sample rate conversion module is that no down-sampling is performed on input signals having sampling rate higher than 48 kHz so the audio quality is not negatively affected by using various embodiments described herein.

Figure 2:
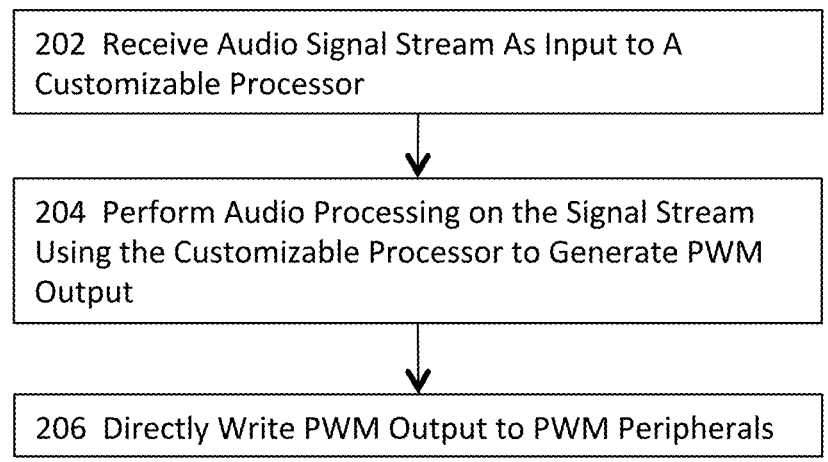
FIG. 2 illustrates a high-level flow diagram of a process for implementing pulse-density modulation audio intellectual property block in some embodiments.

FIG. 2 illustrates a high-level flow diagram of a process for implementing pulse-density modulation audio intellectual property block in some embodiments. In some embodiments, the method includes the process of receiving an audio signal stream as an input to a customizable processor. An input audio stream may include various discrete-time signals having a variety of bit-depths (e.g., 8-bit/sample, 16-bit/sample, 24-bit/sample, 32-bit/sample, etc.) and a variety of sampling rates (e.g., 48 kHz, 96 kHz, 192 kHz, 2.8224 MHz, etc.) in some of these embodiments. With the addition of an analog-to-digital converter between an analog input (e.g., from the output of a turntable) and the pulse-density modulation audio intellectual property block described herein, the input signal may also include analog signals in some other embodiments.

A customizable processor may include a PDM processor core and optionally a peripheral portion including one or more PDM peripherals. The customizable processor architecture will be described in greater details in the following paragraphs with reference to FIGS. 3, 4A-B, and 5. At 204, the method may perform audio processing on the input signal stream using the customizable processor to generate PWM output. In some embodiments, the method may use one or more algorithms stored in the firmware to perform the audio processing. More details about the audio processing will be described in subsequent paragraphs with reference to FIGS. 2A-C.

The method may then directly write the PWM output to the storage of one or more PWM peripherals at 206. In some of these embodiments, the method may directly write the PWM output to the storage of one or more PWM peripherals via one or more peripheral interfaces without using any bus architecture. The one or more peripheral interfaces may include, for example but not limited to, such as one or more lookup interfaces, one or more custom defined, configurable ports, one or more configurable general-purpose input/output (GPIO) ports, one or more direct registered mapped input/output ports, or one or more designer-defined or instruction-accessible input/output FIFO (first-in-first-out) interfaces, etc.

Figure 2A:
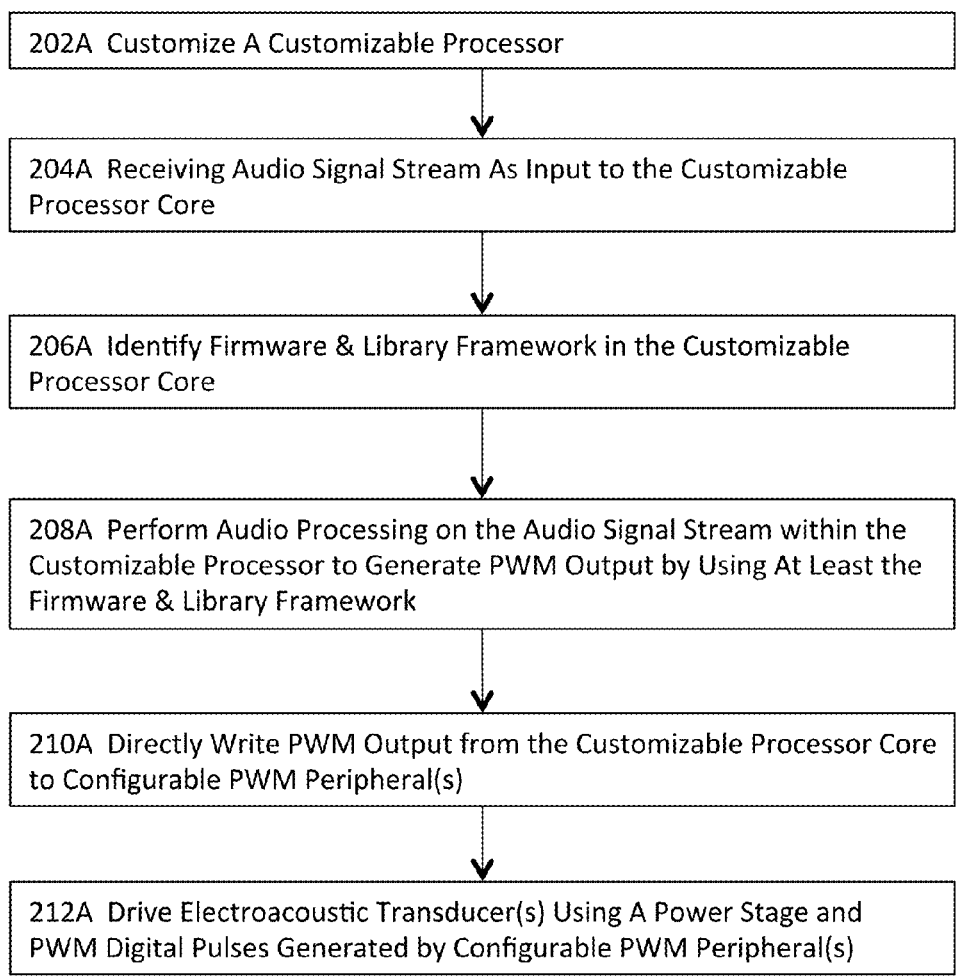
FIG. 2A illustrates a more detailed flow diagram of a process for implementing pulse-density modulation audio intellectual property block in some embodiments.

FIG. 2A illustrates a more detailed flow diagram of a process for implementing pulse-density modulation audio intellectual property block in some embodiments. In the embodiments illustrated in FIG. 2A, the method may include the process of customizing a customizable processor. In some of these embodiments, the customizable processor may include a dataplane processor provided by Cadence Design Systems, Inc. of San Jose, Calif. At 204A, the method may receive an audio signal stream as input to the customizable processor core such as the PWM processor core. The customizable processor core may include a DSP, a part of a DSP, or a part of a DPU implemented as a part of a system on a chip in some embodiments.

The method may comprise the process 206A of identifying the firmware and the library framework stored upon the customizable processor. More details about the firmware and the library framework will be described in subsequent paragraphs with reference to FIGS. 2B-D and 6. At 208A, the method may perform audio processing on the audio signal stream within the customizable processor to generate PWM output by using at least the firmware and at least a part of the library framework. Audio processing may include performing one or more post-processing tasks on the audio signal stream in some embodiments. The one or more post-processing tasks may include sampling rate conversion, equalization, or audio mixer. At least some of the one or more post-processing tasks are completely firmware-driven and implemented as a piece of code in the firmware residing on the customizable processor to allow dynamic configurability or co-optimization.

In some of these embodiments, the PWM output may include the PWM output samples (e.g., 8-bit samples) or PWM duty cycle values. At 210A, the method may include the process of directly writing the PWM output to storage of one or more configurable PWM peripherals via one or more core-to-peripheral interfaces. In these embodiments, the method may directly write the PWM output to the storage of one or more configurable PWM peripherals without using any bus architecture include serial and parallel computer buses. In some embodiments, at least one of the configurable PWM peripherals (e.g., a PWM counter or time-proportioning algorithm) is completely firmware-based or firmware-driven and is thus dynamically configurable on the fly by updating, modifying, or configuring the corresponding portion of the firmware. At 212A, the method may drive one or more electroacoustic transducers (e.g., speakers) using a switch power stage and PWM digital pulses generated by at least one of the one or more configurable PWM peripherals. In some of the embodiments, the one or more configurable PWM peripherals may be implemented as a part of the customizable processor. In some of the embodiments, the one or more PWM peripherals or the switch power stage may be situated remotely and externally to the customizable processor.

Figures 1, 2B:
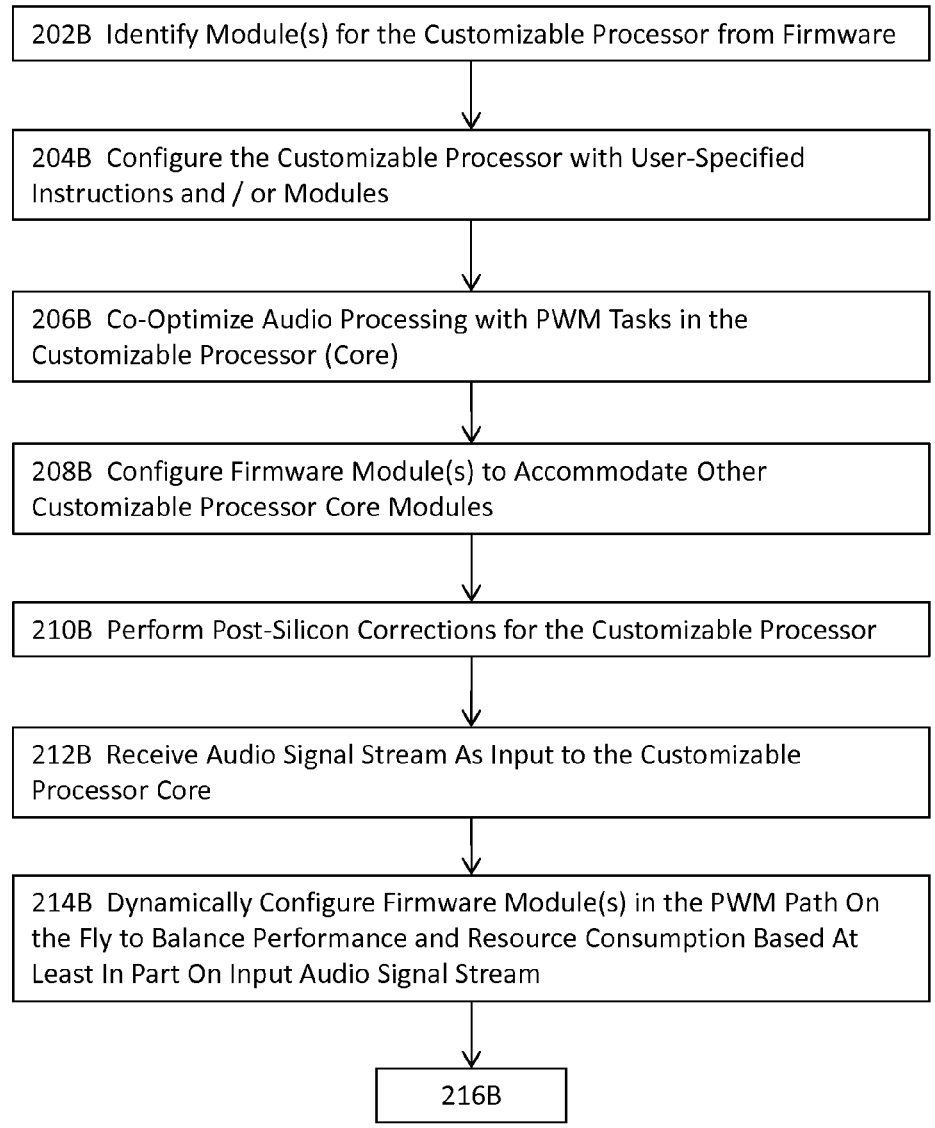
Figures 2, 2B:
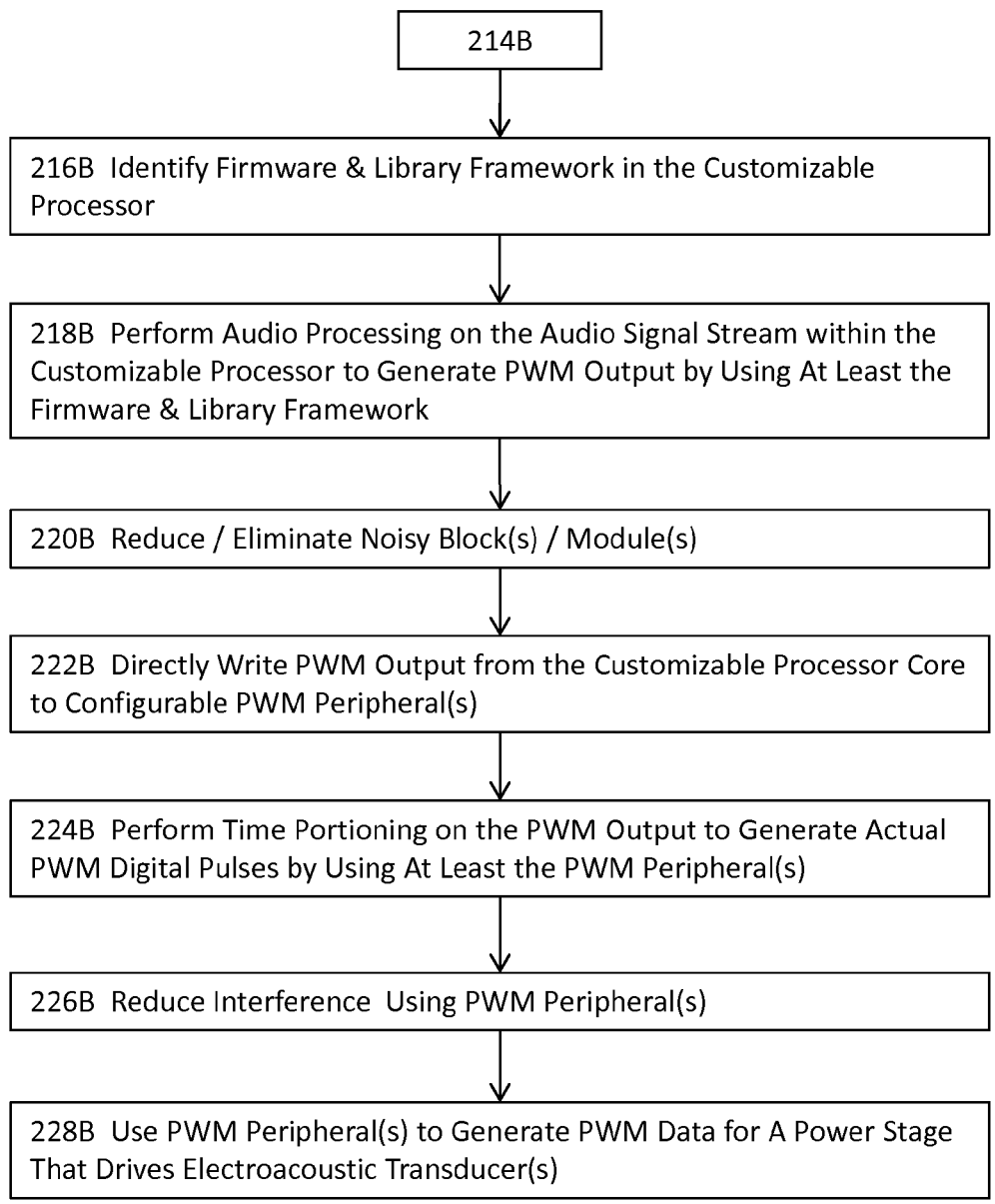

FIGS. 2B-1 and 2B-2 illustrates a more detailed flow diagram of a process for implementing pulse-density modulation audio intellectual property block in some embodiments. In the embodiments illustrated in FIGS. 2B-1 and 2B-2, the method may include the process 202B of identifying one or more modules for the customizable processor from the firmware. The one or more modules identified from the firmware may include, for example but not limited to, one of several variants of a sampling rate conversion module, one of several variants of an equalization module (e.g., a five-band, tenband, or twenty-band equalization module), one of several variants of an audio mixer module, one of several variants of a pulse-width modulator, one of several variants of a noise shaping module, one of several variants of a quantization module, one of several variants of an interpolator, one of several variants of a PWM counter or time-proportioning module, filter coefficients of various filters, one or more parameters of various parameterized modules, etc.

At 204B, the method may configure the customizable processor with the one or more modules identified at 202B. In some of these embodiments, the method may further optionally configure the customizable processor with user-specified instructions. For example, a user may provide specific user-defined instructions to configure the firmware of a customizable processor to include one or more firmware modules to reduce or eliminate electromagnetic interference. As another example, the user may also provide specific instructions to the instruction set of the customizable processor to use the user's own filter coefficients, rather than the default filter coefficients provided in the firmware. The user may also provide specific instructions to configure the number or types of peripheral interfaces or IO ports in customizable processor.

The method may further include the process 206B of co-optimizing audio processing with one or more PWM tasks in the customizable processor or in the customizable processor core according to one or more co-optimization objectives or goals including, for example but not limited to, performance, audio quality, power consumption, cycles per second, die size of the customizable processor, or any combinations thereof. At 208B, the method may optionally configure the one or more firmware modules identified at 202B to accommodate one or more other customizable processor core modules including a digital signal processor. The method may also optionally include the process 2108 of performing one or more post-silicon or post-fabrication corrections for the customizable processor.

These one or more corrections may be performed by updating or configuring the firmware after the customizable processor has been fabricated and may include, for example but not limited to, introducing new functionalities to the customizable processor without respins, custom defining IOs (inputs/outputs) by users, mimicking RTL-style (register transfer level) hardware data flows, changing one or more existing modules (e.g., one or more post-processing modules for audio processing), or fixing one or more bugs in the customizable processor. At 2128, the method may receive an audio stream as input to the customizable process core in substantially similar or identical manners as those described for FIGS. 2 and 2A. The method may also optionally include the process 214B of dynamically configuring one or more firmware modules along the PWM path on the fly to balance performance or quality against resource consumption based at least in part upon the input audio signal stream.

For example, the method may identify the input audio signal stream to have some lower definition or fidelity (e.g., voice dialog) and dynamically choose less power-consuming modules or disable one or more modules (e.g., equalization, mixer, etc.). On the other hand, the method may identify the input audio signal stream to have some higher definition or fidelity (e.g., super audio CD signal streams having 2.8224 MHz sampling rate), the method may opt for one or more high performance or high quality modules that may require more mega-cycles per second and thus may consume more power. At 216B, the method may identify the firmware and the library framework in the customizable processor. The firmware or the library framework may be stored in some persistent memory within or external to the customizable processor and will be described in greater details in subsequent paragraphs with reference to FIG. 6.

The method may further include the process 2188 of performing audio processing on the input audio signal stream within the customizable processor or the customizable processor core to generate PWM output samples using at least a part of the firmware and the library framework. The user may configure the PWM output by altering the bit depth per sample. The method may further optionally include the process 220B of reducing or eliminating one or more noisy blocks or modules in some embodiments. For example, the method may further optimize the customizable processor by eliminating sampling rate converter that requires re-sampling of analog input signals due to the pure digital nature of some implementations described herein.

At 222B, the method may directly write the PWM output samples from the customizable processor core to the storage of one or more configurable PWM peripherals by using one or more core-to-peripheral interfaces. For example, the method may directly write the PWM output samples to the memory accessible by, for example, the PWM counter via a designer-defined or instruction-accessible input/output FIFO (first-in-first-out) interface in some embodiments. In some other embodiments, the method may directly write the PWM output samples to, for example, the memory accessible by, for example, the PWM counter via input/output RAM in the customizable processor core via a DMA (direct memory access), UDMA (ultra direct memory access), or serial ATA (serial advanced technology attachment) interface with an appropriate controller module.

The terms DMA, UDMA, and SATA are collectively referred to as DMA, unless otherwise specifically recited or claimed. In various embodiments, directly writing PWM output to storage accessible by one or more PWM peripherals does not use any computer buses such as a serial computer bus or a parallel computer bus. At 224B, the method may then invoke a time proportioning module such as a PWM counter that is operatively connected to the clock and determines which portion of a cycle time is to be in the high state based on the PWM duty cycle values to generate the actual PWM digital pulses. In some embodiments, the time proportioning module may be implemented as a PWM firmware module to allow for dynamic configurability or co-optimization.

In addition or in the alternative, the method may further optionally reduce electromagnetic interference or amplitude modulated interference at 226B by using, for example, bypass or decoupling capacitors on active devices, rise time control of high-speed signals with resistors, or Vcc filtering, etc. At least some of the measures to reduce electromagnetic interference or amplitude modulated interference may be implemented as a firmware module for dynamic configurability or co-optimization. At 228B, the method may further use one or more PWM peripherals to generate PWM data for a power stage that drives one or more electroacoustic transducers in identical or substantially similar manners as those described for 212A of FIG. 2A.

Figure 2C:
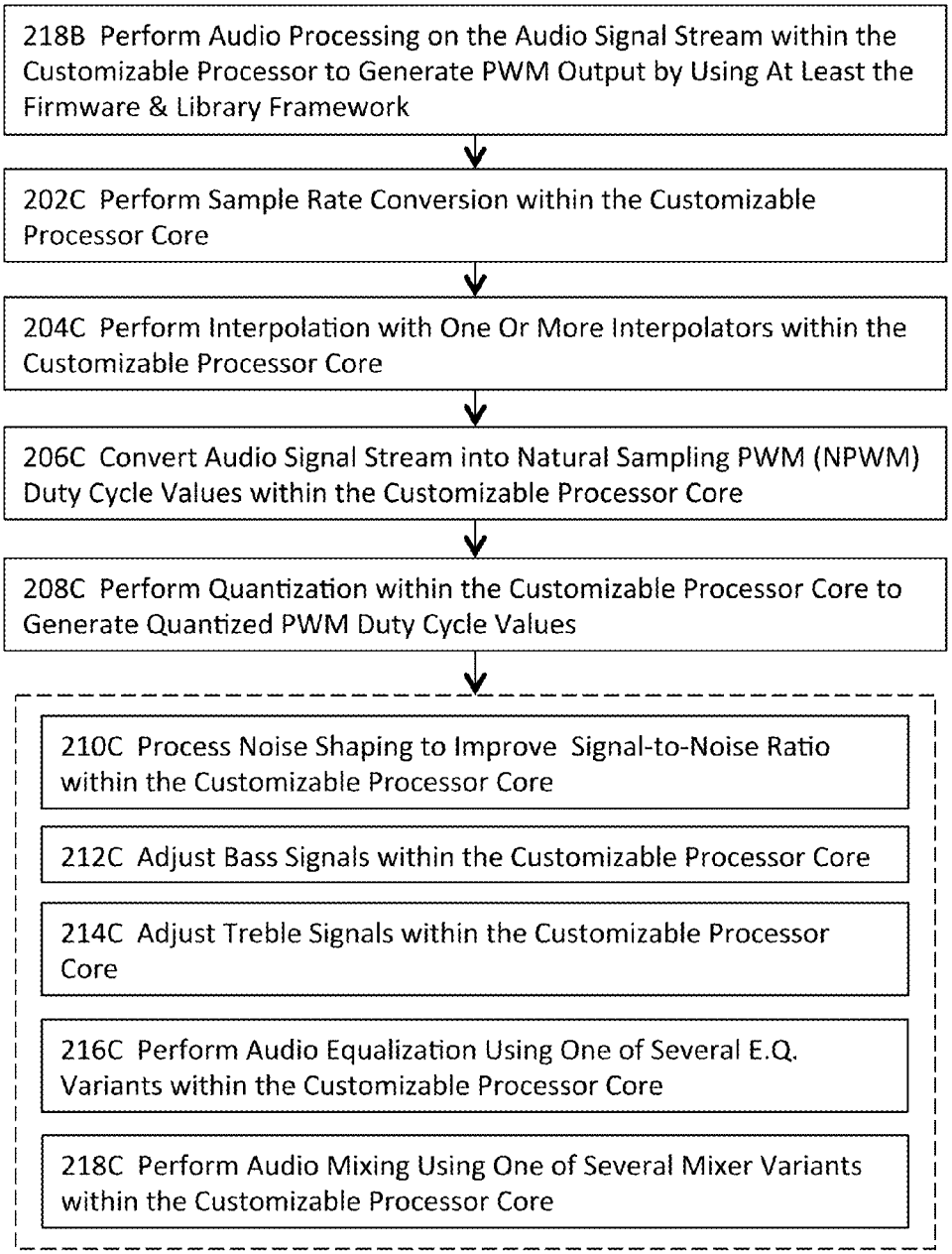
FIG. 2C illustrates a more detailed flow diagram for a sub-process illustrated in FIGS. 2B-1 and 2B-2 in some embodiments.

FIG. 2C illustrates a more detailed flow diagram for a sub-process illustrated in FIGS. 2B-1 and 2B-2 in some embodiments. More specifically, FIG. 2C illustrates a flow diagram of the process for performing audio processing on an audio signal stream. In some embodiments where the customizable processor core includes the optional sample rate conversion module, the method may perform sample rate conversion within the customizable processor core at 202C to change the input audio signal stream having a sampling rate to another discrete-time audio signal stream having a different sampling rate. One or more post-processing tasks may be further optionally performed on the audio signal stream. These one or more tasks may include audio equalization or audio mixing and may be implemented as a part of the firmware in some embodiments.

The sample rate conversion module may be implemented as a part of the firmware such that the sample rate conversion module may be co-optimized with other firmware-based modules or dynamically configured. Moreover, the customizable processor core described herein may be fully digital in some embodiments so that downsampling may be completely avoided when the sampling frequency of the input audio signal stream is higher than a threshold rate such as 48 kHz as is required in some analog PWM conventional approaches. Depending upon the sampling rate or sampling frequency of the input audio signal stream, the method may further interpolates the output signal of the sample rate converter with one or more interpolators at 204C.

For example, the method may use two 2×-interpolators to change a 96-kHz audio signal stream to a 384-kHz signal stream or three 2×-interpolators to change a 48-kHz audio signal stream to a 384-kHz signal stream. No downsampling needs to be performed, and thus the audio quality or definitions may be improved or at least preserved. At 206C, the audio signal stream may be processed by a PDM module (e.g., a natural sampling PWM or NPWM) to generate PDM output samples with a user-specified or default bit-depth (e.g., 24-bit/sample). Noise shaping may also be optionally performed at 210C in conjunction with quantization to increase the signal-to-noise ratio of the resulting signal (the quantized PWM duty cycle values). At 208C, quantization may be performed to process the PDM output samples from 206C to generate quantized PDM duty cycle values or quantized PDM samples (e.g., 8-bit/sample PDM samples).

The method may further perform bass adjustment at 212C, treble signal adjustment at 214C, or mid-range adjustment. In addition or in the alternative, the method may perform audio equalization at 216C to modify the frequency response of the audio signal stream by using, for example, linear filters to adjust the amplitude of the audio signal stream at specific frequencies. Audio mixing may also be optionally performed as a part of audio processing to combine multiple sounds into one or more channels at 218C. In some embodiments, at least one of the various modules (202C, 204C, 206C, 208C, 210C, 212C, 214C, 216C, and 218C) described above with reference to FIG. 2C may be implemented as completely firmware-based module as a part of the firmware residing in the customizable processor to allow co-optimization or dynamic configurability of the at least one of these various modules.

Figure 2D:
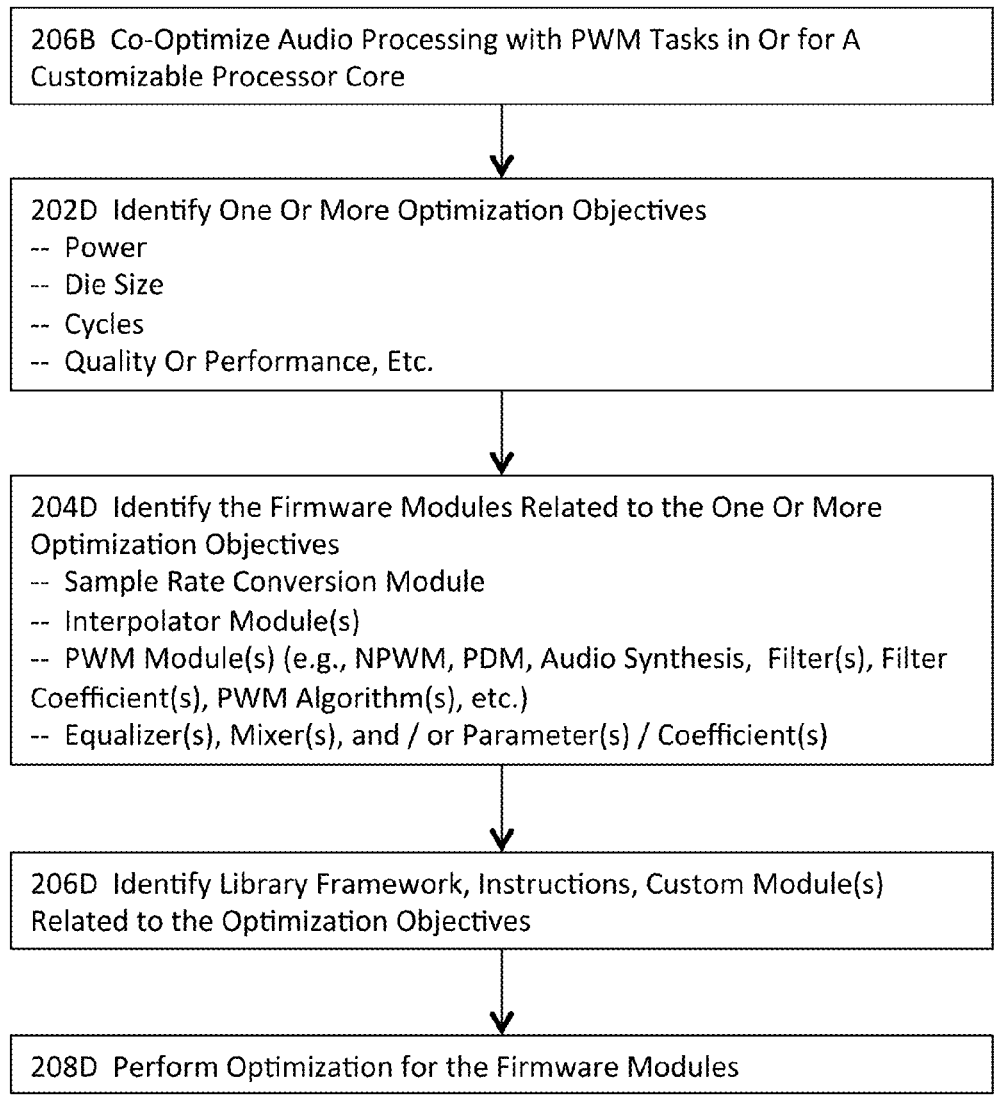
FIG. 2D illustrates a more detailed flow diagram for a sub-process illustrated in FIGS. 2B-1 and 2B-2 in some embodiments.

FIG. 2D illustrates a more detailed flow diagram for a sub-process illustrated in FIGS. 2B-1 and 2B-2 in some embodiments. More specifically, FIG. 2D illustrates more details about co-optimization of audio processing with various PWM tasks in a customizable processor or customizable processor core as described for 206B of FIG. 2D. The process may identify one or more optimization objectives or goals at 202D. The one or more optimization objectives or goals may include, for example but not limited to, power consumption, die size of the customizable processor or customizable processor core, clock speed (e.g., mega-cycles per second or MHz), quality or performance, or any combinations thereof. Some of the optimization objectives or goals may be competing against each other.

For example, higher performance or quality audio signal stream often requires more intense computation and may thus require higher clock speed and more power consumption. Higher performance or quality audio signal stream may also require or desire more complex EMI reduction or noise shaping modules and thus may increase the die size if any part of these more complex EMI reduction or noise shaping modules is implemented as hard-wired circuitry or may demand more intense computation if any part of these modules is implemented as, for example, a firmware-based module. In some embodiments, the method balances the one or more objectives or goals and determines a better compromise among these one or more objectives or goals. In some of these embodiments, the method may dynamically configure various firmware-based modules to achieve a better balance among the one or more objectives or goals based at least in part upon the input audio signal stream.

For example, the method may dynamically choose lower power consuming modules if the input audio signal stream is determined to contain mere voice dialog. On the other hand, the method may dynamically opt for more complex and more power consuming modules if the input audio signal stream contains some high definition audio signals. At 204D, the method may further identify one or more firmware or hardware modules that are related to realization of the one or more optimization objectives or goals identified at 202D. For example, the method may identify one or more sample rate hardware or firmware converters, the types and number of interpolators, one or more firmware or hardware PWM modules, and one or more post-processing hardware or firmware modules, etc.

The one or more firmware or hardware PWM modules may include NPWM hardware or firmware module, PDM hardware or firmware module, audio synthesis hardware or firmware module, one or more filters used in PDM or PWM, filter coefficients, etc. The one or more post-processing hardware or firmware modules may include hardware or firmware modules for equalizers, mixers, parameters, or coefficients, etc. Library framework such as a PWM library frame work, instructions, or user-specified custom modules or parameters that are related to the identified one or more optimization objectives or goals may also be identified at 206D.

For example, user-defined instructions may be used to customize the firmware of the customizable processor to perform one or more of the PWM tasks more efficiently in ters of, for example, power-area-speed by modifying the hardware resources of the customizable processor so as to improve or optimize, for example, the customizable processor for application specific devices or systems or one or more requirements of one or more operations or one or more operation sequences of a customizable processor. As another example, the user may also provide specific instructions to the firmware of the customizable processor to use the user's own filter coefficients, rather than the default filter coefficients provided in the firmware. The user may also provide specific instructions to configure the number or types of peripheral interfaces or IO ports in customizable processor. At 208D, the method may perform co-optimization for the audio processing with PWM tasks in or for a customizable processor or customizable processor core. When die-size is identified as one of the optimization objectives or goals, co-optimization may be performed at the planning and design stage to identify and choose various modules or components that best fit these objectives and goals.

For example, if small die-size, high performance, and high audio quality are identified as the optimization objectives, the method may choose to implement some or even all of the audio processing modules and PWM modules as purely firmware-based modules residing in the firmware. Fully firmware based modules may be computation intensive while being capable of providing high performance and high definition audio signals but may nevertheless reduce the die size due to the elimination of hardwired circuit blocks and thus meet the objectives.

Figure 2E:
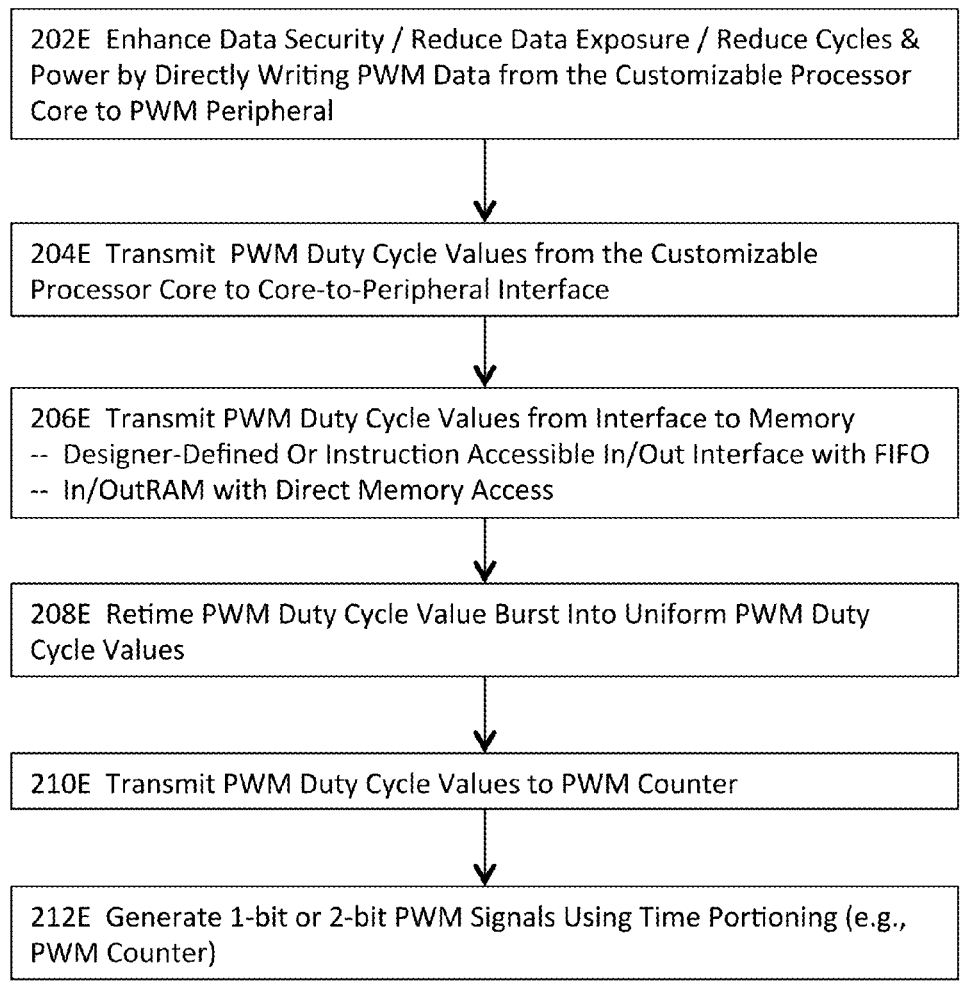
FIG. 2E illustrates a more detailed flow diagram of a sub-process for implementing pulse-density modulation audio intellectual property block in some embodiments.

FIG. 2E illustrates a more detailed flow diagram of a sub-process for implementing pulse-density modulation audio intellectual property block in some embodiments. More specifically, FIG. 2E illustrates using one or more PWM peripherals to further process the output signals from the customizable processor core to generate the PWM pulses. At 202E, the process include the process of enhancing data security, reducing data exposure, reducing cycles and power consumption by directly writing PWM output data from the customizable processor core to one or more PWM peripherals. The process first transmits the PWM samples (e.g., PWM duty cycle values) from the customizable process core to a core-to-peripheral interface at 204E. The core-to-peripheral interface may include a DMA (direct memory access) interface through which PWM output data in an input/output RAM in the customizable processor core may be moved in some embodiments. The core-to-peripheral interface may include a designer-defined or instruction-accessible input/output FIFO (first-in-first-out) interface in some embodiments.

In various embodiments, directly writing PWM output data to storage accessible by one or more PWM peripherals does not use any computer buses such as a serial computer bus or a parallel computer bus. The FIFO depth may be determined based at least in part upon the writing burst rate, the writing burst size, and the reading clock. The process may then transmit the PWM output data at 206E from the core-to-peripheral interface to memory accessible by one or more PWM peripherals. At 208E, the process may retime the PWM output data burst into uniform PWM output data and then transmits the uniform PWM output data to a time proportioning module such as a PWM counter at 210E. The time proportioning module then processes the retimed, uniform PWM output data into PWM digital pulses that may include 1-bit/channel PWM pulses for single-ended signaling or 2-bit/channel PWM pulses for differential signaling at 212E. In addition or in the alternative, the 2-bit/channel PWM pulses for differential signaling may further be configured to implement tri-level signaling to, for example, reduce electromagnetic interference (EMI) via selecting or invoking one or more firmware modules including EMI suppression or reduction features in conjunction with one or more PWM peripherals.

Figure 3:
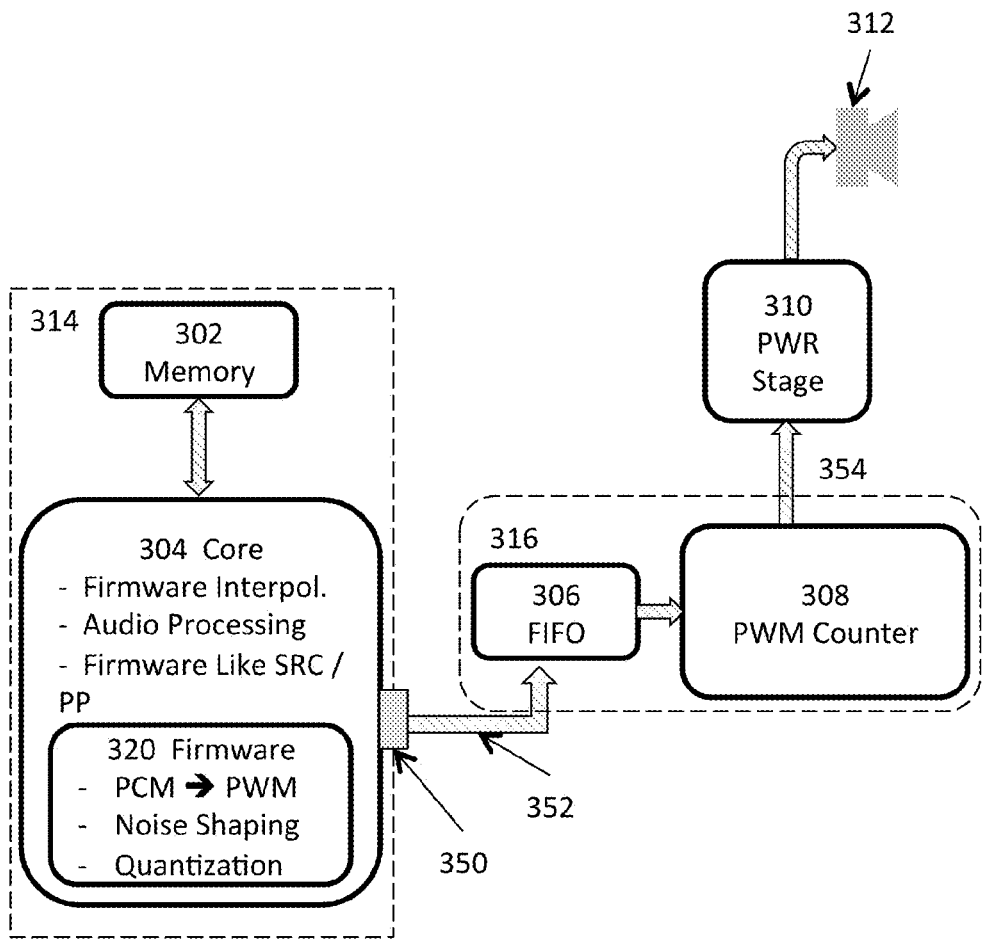
FIG. 3 illustrates a schematic block diagram for a module or system for implementing a pulse-density modulation audio intellectual property block in some embodiments.

FIG. 3 illustrates a schematic block diagram for a module or system for implementing pulse-density modulation audio intellectual property block in some embodiments. In the embodiments illustrate in FIG. 3, the module or system may include a PWM processor core 314. In some of these embodiments, the module or system may further optionally include the PWM peripheral module 316 which is communicably coupled to the PWM processor core 314. The PWM peripheral module 316 receives and processes PWM output samples (e.g., PWM duty cycle value samples) to generate and transmit PWM pulses to a power stage 310 (e.g., a switch power stage, a MOSFET or metal-oxide-semiconductor field-effect transistor power stage, etc.). The power stage 310 is used to drive one or more electroacoustic transducers 312 such as one or more speakers.

The PWM processor core 314 may include memory 302 that is communicably coupled to the customizable PWM processor core 304. The PWM processor core 304 may include the firmware 320, a DSP (digital signal processor), a part of a DSP, or a part of a DPU (dataplane processor) and may be implemented as a part of an SOC (system on a chip). The PWM processor core 304 may also be integrated with an off-the-shelf DSP provided by either the developer of the PWM processor core 304 or by third parties. The PWM processor core 304 performs audio processing on incoming audio signal streams to generate PWM output samples such as PWM duty cycle value samples.

The bit-depth of the PWM output samples may be configurable during the design planning stage, during the design implementation stage, or post-fabrication in an on-the-fly manner. The PWM processor core 304 may include one or more post processing modules for its audio processing tasks. Each of these one or more post processing modules may be implemented as hardware modules, software modules, or any combinations thereof. In some embodiments where a post-processing module is implemented as a software module, the post-processing module may be implemented as a part of the firmware 320, which is described below in greater details. These one or more post processing modules may include one of several variants of interpolators to change the input signal sampling frequency for PWM tasks, one of several variants of audio equalizers to change the frequency responses, or one of several variants of audio mixers to combine sound signals into one or more channels. For example, the one or more post processing modules may include one or more bass generation filters, etc. in some of these embodiments.

These one or more post processing modules may further optionally include one of several variants of sampling rate converters to convert the sampling rate of a discrete-time signal into anther discrete-time signal having a different sampling rate. For example, a sampling rate converter may convert an input signal having a 44.1 kHz sampling rate into an output signal having a 48 kHz sampling rate. The PWM processor core 304 may also include one or more variants of a quantizer or a bit-depth reduction module, which is used to map a larger set of input signal values into a smaller set of output signal values, as well as one of several variants of a noise shaper, which is used to improve the signal-to-noise ratio.

The quantizer or bit-depth reduction module may, for example, map a signal having 16-bit/sample audio bit depth to PWM samples having 8-bit/sample audio bit depth or a signal having 24-bit/sample audio bit depth to PWM samples having 16-bit/sample audio bit depth or 8-bit/sample audio bit depth. The quantizer may also optionally function in conjunction with the noise shaping module to generate the PWM output samples at the desired bit-depth while improving the signal-to-noise ratio. Each of the quantizer, the bit-depth reduction module, and the noise shaping module may be implemented as a hardware module, a software module, or any combinations thereof. In some embodiments where one of these aforementioned modules is implemented as a software module, the module may be implemented as a part of the firmware 320, which is described below in greater details.

The PWM processor core 304 may further include the firmware 320 stored in a non-transitory, persistent memory. The firmware may include the data (e.g., parameters, coefficients, libraries, information or data about various modules, interfaces, etc.) and program code for various modules (e.g., one or more post processing modules, the rate sampling converter, the quantizer, or the noise shaping module, etc.) described herein. For example, various variants of the SRC module (e.g., modules for analog signals or for digital input signals, various algorithms for changing sampling rates, etc.) may also be stored in the firmware residing in the DSP, a part of a DSP, or a DPU on an SOC for dynamic configurability or co-optimization purposes.

The PWM processor core 304 may use a controller identical or substantially similar to a direct memory access controller circuitry to read from or write to memory 302. The PWM processor core 304 may further use one or more core-to-peripheral interfaces 350 to transmit data to the PWM peripheral module 316. The one or more core-to-peripheral interface 350 may include, for example but not limited to, one or more lookup interfaces, one or more custom defined, configurable ports, one or more configurable general-purpose input/output (GPIO) ports, one or more direct registered mapped input/output ports, or one or more designer-defined or instruction-accessible input/output FIFO (first-in-first-out) interfaces, etc. to transmit, for example, PWM output samples 352 to the PWM peripheral module 316. In some embodiments, PWM output samples 352 may be transmitted directly to the PWM peripheral module 316 (e.g., FIFO 306) via some memory (e.g., memory 302) of the processor core 304, without having to use any of the core-to-peripheral interface 350.

The PWM peripheral module 316 receives and processes the PWM output samples 352 to generate the actual PWM digital pulses 354 and further transmits the PWM digital pulses 354 to one or more power stages 310 which in turn drive the one or more electroacoustic transducers 312. The PWM output samples 352 may be transmitted from the PWM processor core 304 into memory 306 such as a queue or buffer subject to FIFO processing. The FIFO processing retimes the input data burst into the PWM pulses, which is a more uniform output stream, and then to a PWM counter or a PWM time proportioning module 308 to determine which proportion of a cycle time is in the high state for the PWM digital pulses.

It shall be noted that these embodiments illustrated in FIG. 3 are fully digital and include no digital-analog converters or application processors usually found in conventional analog or digital PWM audio devices. The functions of a conventional digital-analog converter in conventional audio processors are performed by the PWM processor core 304, a part of the PWM peripheral 316, and the firmware 320. Moreover, each of the various modules described herein with reference to FIG. 3 may be implemented as a software module such as a firmware-based module as a part of the firmware. Such firmware implementations not only provide more flexibility as well as dynamic configurability and co-optimization among various modules but also reduce the number of cycles per unit time required by various hardware modules.

The reduction of the number of cycles per unit time further reduces the power consumption and thus improves the power requirement per unit area on silicon. This improvement on the power requirement per unit area on silicon is especially important in modern mobile devices providing audio playback or recording capability, especially when compared to conventional class-D PWM solutions. The direct transfer of data between PWM processor core 304 and the PWM peripheral module 316 via the one or more core-to-peripheral interfaces further reduces or eliminates the possibility of exposing the audio data to a third-party module (e.g., a third-party DSP or application processor). The module or system may be implemented on an SOC and includes the PWM processor core 314 in the embodiments illustrated in FIG. 3. In some of illustrated embodiments, the module or system may further include all or a part of the PWM peripheral module 316 in the SOC as an integrated solution.

Figure 4A:
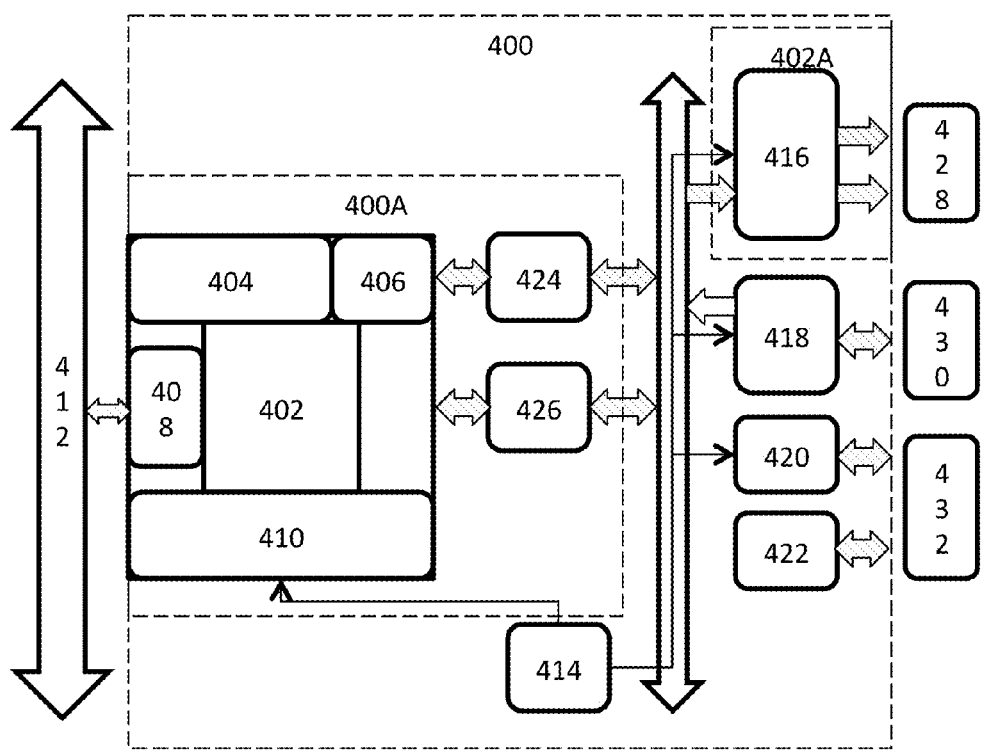
FIG. 4A-B illustrate another schematic block diagrams for modules or systems for implementing a pulse-density modulation audio intellectual property block in some embodiments.
Figure 4B:
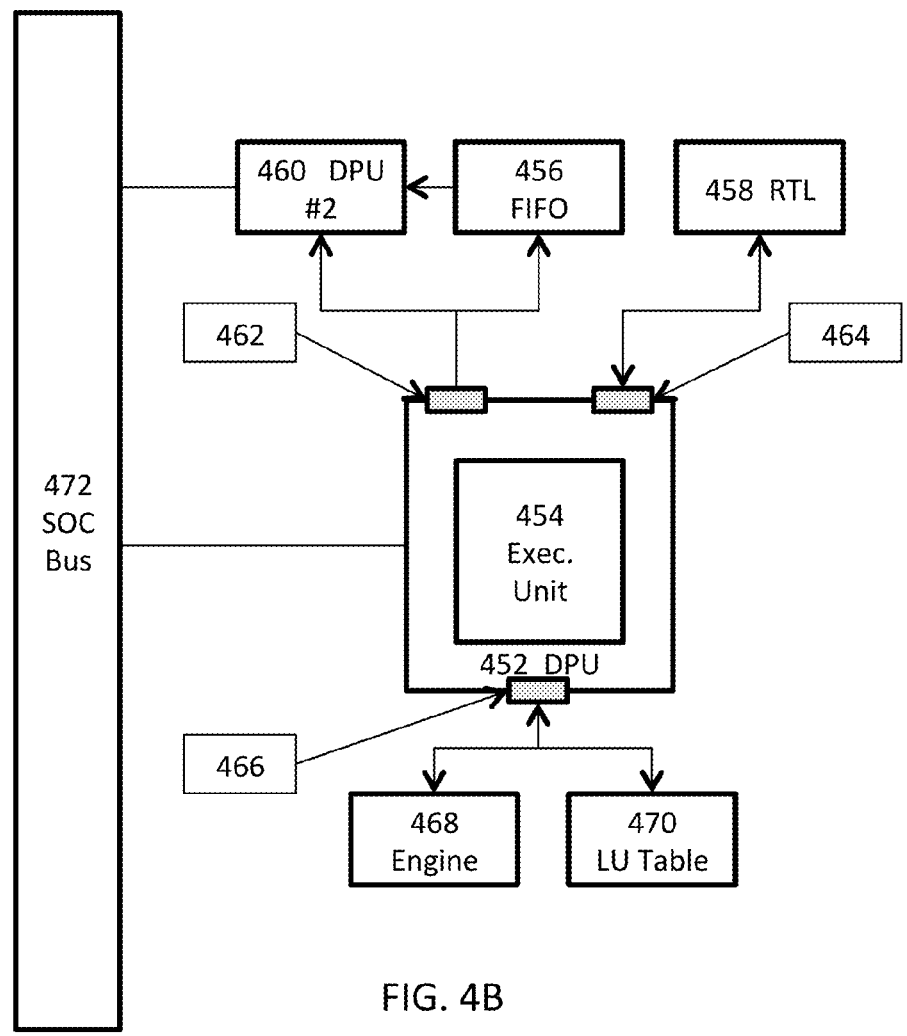

FIG. 4A-B illustrate another schematic block diagrams for modules or systems for implementing pulse-density modulation audio intellectual property block in some embodiments. More specifically, FIG. 4A illustrates a schematic block diagram for a module or system 400 for implementing pulse-density modulation audio intellectual property block. The illustrated module or system 400 is communicably coupled to data transfer architecture 412 (e.g., an SOC bus architecture) to receive input signal streams for processing. The illustrated module or system 400 may include the PWM processor core 400A communicably coupled to, via the one or more core-to-peripheral interfaces 424 (e.g., DMA interface) or 426 (e.g., FIFO interface), the PWM peripheral module 402A, one or more one IIC (inter-integrated circuit) 420, and/or one or more general purpose I/O (GPIO) ports 422.

The PWM peripheral module 402A, one or more receiving IIS (inter-IC sound) serial interfaces 418, one or more one transmitting IIC (inter-integrated circuit) 420, and/or one or more general purpose I/O ports 422 are further interfaced with one or more power stages 428, one or more analog-to-digital conversion modules 430, and/or one or more control logic module 432. The module or system 400 further includes a clock management unit 414 that is communicably coupled to the PWM processor core 400A, the PWM peripheral module 402A, the one or more receiving IIS (inter-IC sound) serial interfaces 418, and the one or more one transmitting IIC (inter-integrated circuit) 420.

The PWM processor core 400A may include an audio processing core 402, memory 404 (e.g., i-RAM), memory 406 (e.g., DRAM), one or more core-to-peripheral interfaces such as one or more designer-defined or instruction-accessible input/output FIFO (first-in-first-out) interfaces 424 or one or more DMA interfaces 426, an internal interface to communicate with the data transfer architecture 412, and an instruction cache 410 storing thereupon some standard instructions or custom-defined instructions. The audio processing core 402 may include one or more post processing modules and may be co-optimized with one or more PWM modules (e.g., a quantizer or a noise shaping module). In these embodiments, the co-optimization of one or more PWM modules maybe done with various post processing modules that include, for example but not limited to, an equalization module, an audio mixer, one or more interpolators, one or more bass generation filters, and/or a sample rate converter.

During operation, the audio processing engine receives input audio signal stream from the data transfer architecture 412 via the external interface 408 and performs one or more post-processing tasks as well as some PWM tasks by respectively using one or more post-processing modules and one or more PWM modules in the audio engine 402 to generate PWM output samples (e.g., 24-bit/sample output samples from an NPWM module or 8-bit/sample PWM duty cycle values or PWM samples from a quantizer) based at least in part upon the clock from the clock management module 414. The generated PWM output samples are transmitted to the PWM peripheral module 402A via one or more designer-defined or instruction-accessible input/output FIFO (first-in-first-out) interfaces 424 or one or more DMA interfaces 426. The PWM peripheral module 402A may include storage (e.g., a FIFO queue, not shown) and a PWM counter or bit-depth reduction module 416 which retimes the input PWM output samples and generates actual PWM digital pulses that are subsequently transmitted to one or more power stages 428 that in turn drive one or more electroacoustic transducers (not shown). In some embodiments where the PWM counter or bit-depth reduction module 416 includes a stereo PWM counter, the module or system illustrated in FIG. 4A may be implemented as a stereo PWM audio DSP or DPU.

FIG. 4B illustrates a schematic block diagram for a module or system for implementing pulse-density modulation audio intellectual property block. The illustrated module or system includes a dataplane processor or DSP 452 that includes an execution unit 454 and is communicably coupled to, for example, an external data transfer architecture 472 (e.g., an SOC bus). The dataplane processor or DSP 452 may be further communicably coupled to a FIFO queue 456 via a designer-defined or instruction-accessible input/output FIFO (first-in-first-out) interface 462 and to an RTL block 458 via a general purpose I/O port 464. The dataplane processor or DSP 452 may be further communicably coupled to a computing engine (e.g., a variable length computing engine) or one or more lookup tables 470 via a lookup interface 466. The dataplane processor or DSP 452 may be further communicably coupled to another dataplane processor or DSP 452, which may be communicably coupled to the FIFO queue 456, to form a parallel execution framework including multiple dataplane processors or DSPs.

FIG. 5 illustrates variants or components of various modules for implementing pulse-density modulation audio intellectual property in some embodiments. More specifically, the DPU or DSP core may include multiple, different variants of audio digital signal processors or dataplane processors to perform various audio processing tasks. In addition to default or standard instructions, the DPU or DSP core may also execute custom instructions provided by the users. In other words, the users may configure the DSP or DPU described here with the user-specified instructions or instruction sets. The DSP or DPU described herein also supports custom configurations such as the specific variant of sample rate converter, the PWM or PDM algorithm, the filters used or the filter coefficients, the specific variant of audio equalization, bit-depth/sample, or the specific variant of audio mixer, etc. The DSP or DPU described herein may also accommodate different core-to-peripheral interfaces and/or configurable numbers of PWM output ports or channels (e.g., 2.1, 5.1, 6.1, 7.2, etc. multichannel audio). The DSP or DPU described herein may also function in conjunction with a variety of PWM peripheral configurations.

The firmware described herein may include one or more variants of a PWM module described here, one or more variants of an audio processing module, one or more variants of a post processing module, one or more variants of a PWM peripheral, libraries therefor, parameters, coefficients, custom instructions, etc. The firmware may also include one or more multi-rate filter stages or one or more variants of quantization module and/or noise shaping module. The firmware described herein may support one or more variants of the sample rate converter or one or more modules for interference (e.g., EMI or AM) reduction. For example, the firmware may include an EMI reduction module that modifies cross point calculation in, for example, the PWM module, the quantization module, and/or a noise shaping module to support time varying periodicity of output clock or output waveform while substantially maintaining the quality of the signal in some embodiments. In some of these embodiments, the EMI reduction module may perform its EMI reduction functions in conjunction with one or more PWM peripherals that are statically or dynamically configured to support time varying periodicity. For example, the EMI reduction module may transmit one or more control signals to the one or more PWM peripherals to modify the cross points in, for example, the output PWM waveforms while maintaining the impact on the quality of the PWM waveforms to some pre-determined threshold levels.

The firmware may also be configured or programmed to support one or more user-defined modules (e.g., user-defined filters) to afford the user to choose between default modules and the user-defined modules. The firmware may also be configured or programmed to support multiple, different digital signal processors or dataplane processors from various suppliers. The firmware may be configured or programmed to accommodate one or more variants of post-processing modules including, for example but not limited to, a sample rate converter, interpolator, audio equalization module, audio mixer, etc. The firmware may also be configured or programmed to support one or more distortion correction modules or one or more environment correction modules.

For example, the firmware may include the code to receive environment responses to some test audio signals via a microphone and use the environment responses to characterize the environment in which the system or module is located to correct the characteristics of the reproduction of sound. For example, the module or system may adjust the levels of output to any of the left, right, center, sub-woofer, or surround channels according to the environment responses collected by a microphone to optimize the reproduction of sound in this specific environment. The firmware may thus provide the capability to co-optimize, both before and after fabrication, various audio processing modules and the PWM modules. This co-optimization capability is nevertheless impossible for any hard-wired systems or modules. The firmware may also provide the dynamic, on the fly configuration capability by updating the firmware loaded in the module or system described herein.

The PWM peripherals may be configurable during the design or planning stage or even after fabrication. For example, the number of channels and/or the bit-depth per channel of PWM peripherals may be configured either dynamically or during the design or planning stage. The PWM peripheral may also be configured to support external PWM conversion by directly driving the source PCM output through, for example, one or more IIS interfaces to the external PWM conversion module. The PWM bit-depth per channel may also be configurable. For example, the PWM peripheral (e.g., the PWM counter) may be configured to generate 1-bit/channel for single-ended signaling where one wire carries the signal, and the other wire is connected to a reference voltage (e.g., ground).

The PWM peripheral (e.g., the PWM counter) may be configured to generate 2-bit/channel for differential signaling using a differential pair. The FIFO depth may also be configurable based at least in part upon the writing burst size and the reading clock. Various interfaces related to the PWM peripherals may also be configured to have, for example, a direct data interface or a through memory interface. The EMI reduction algorithms or hardware modules may also be configured to adopt specific interference reduction algorithm or hardware module based at least in part upon, for example, one or more optimization or co-optimization objectives or goals. The number of ports or interfaces (e.g., IIS interface, IIC interface, or GPIO port) may also be configured, either during the design or planning stage or post-fabrication.

Various embodiments described herein provide dynamic configurability and the co-optimization of various modules based at least in part upon one or more co-optimization objectives or goals including, for example but not limited to, performance, audio quality, power consumption, cycles per second, die size of the customizable processor, or any combinations thereof. The dynamic configurability or the co-optimization of various modules also provides flexibility in the design, manufacturing, or using various modules and systems described herein and makes the post-fabrication fixes or corrections possible.

System Architecture Overview

Figure 6:
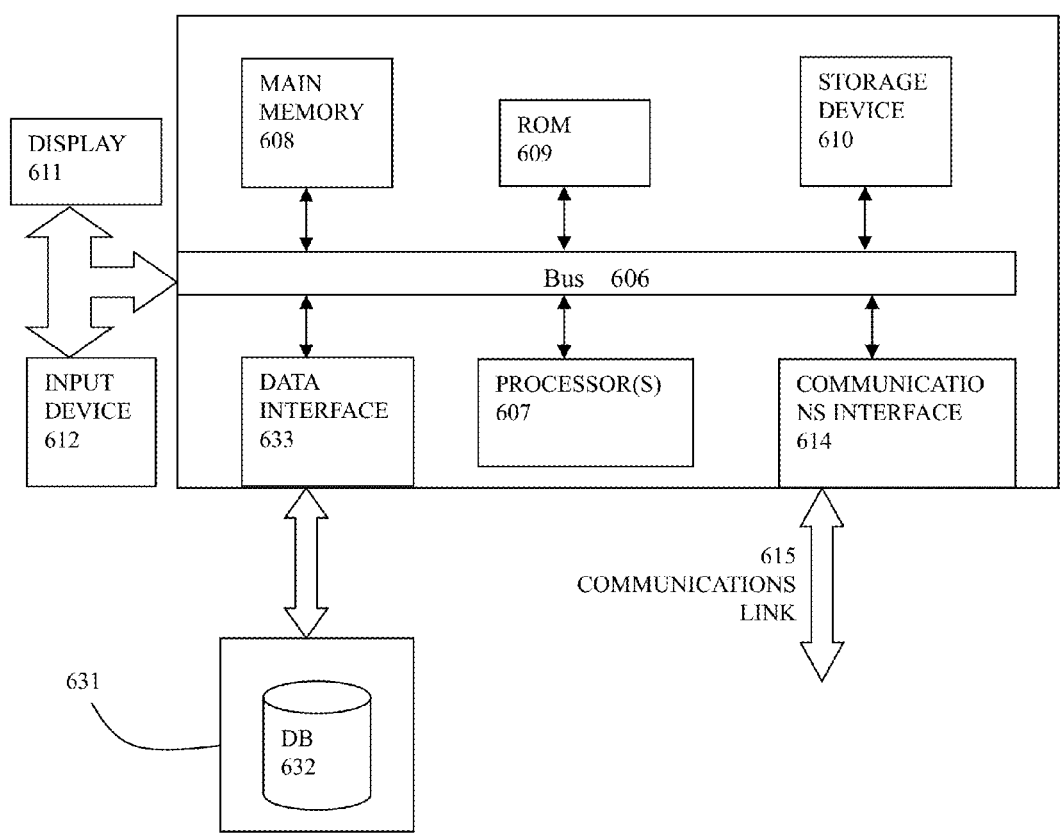
FIG. 6 illustrates a computerized system on which a method for implementing a pulse-density modulation audio intellectual property may be implemented.

FIG. 6 illustrates a block diagram of an illustrative computing system 600 suitable for implementing pulse-density modulation audio intellectual property block as described in the preceding paragraphs with reference to various figures. Computer system 600 includes a bus 606 or other communication mechanism for communicating information, which interconnects subsystems and devices, such as processor 607, system memory 608 (e.g., RAM), static storage device 609 (e.g., ROM), disk drive 610 (e.g., magnetic or optical), communication interface 614 (e.g., modem or Ethernet card), display 611 (e.g., CRT or LCD), input device 612 (e.g., keyboard), and cursor control (not shown).

According to one embodiment, computer system 600 performs specific operations by one or more processor or processor cores 607 executing one or more sequences of one or more instructions contained in system memory 608. Such instructions may be read into system memory 608 from another computer readable/usable storage medium, such as static storage device 609 or disk drive 610. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 607, where the one or more processors, one or more processor cores, or combination thereof executes one or more threads. For example, these various actions or processes may include, for example but not limited to, the act of customizing a customizable processor either at the design or planning stage or during some post-fabrication stages, dynamic configurability during the design or planning stage, co-optimization during the design or planning stage, etc.

The term "computer readable storage medium" or "computer usable storage medium" as used herein refers to any medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 600. According to other embodiments of the invention, two or more computer systems 600 coupled by communication link 615 (e.g., LAN, PTSN, or wireless network) may perform the sequence of instructions required to practice the invention in coordination with one another.

Computer system 600 may transmit and receive messages, data, and instructions, including program, i.e., application code, through communication link 615 and communication interface 614. Received program code may be executed by processor 607 as it is received, and/or stored in disk drive 610, or other non-volatile storage for later execution. In an embodiment, the computer system 600 operates in conjunction with a data storage system 631, e.g., a data storage system 631 that contains a database 632 that is readily accessible by the computer system 600. The computer system 600 communicates with the data storage system 631 through a data interface 633. A data interface 633, which is coupled to the bus 606, transmits and receives electrical, electromagnetic or optical signals that include data streams representing various types of signal information, e.g., instructions, messages and data. In embodiments of the invention, the functions of the data interface 633 may be performed by the communication interface 614.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A programmable processor, comprising:
   a firmware stored in non-transitory machine readable memory located in a programmable micro-processor and comprising one or more audio processing modules; and
   a processor core operatively coupled with the firmware to receive and perform one or more processing tasks on an input audio signal by executing at least a first module of the one or more audio processing modules in the firmware to generate pulse-density modulation (PDM) output samples, wherein
      the processor core is implemented on the semiconductor substrate, and
      the one or more audio processing modules in the firmware comprise one or more filters to improve harmonic content of the PDM output samples.

2. The programmable processor of claim 1, wherein the one or more audio processing modules in the firmware comprise at least one of: an audio mixing module, an audio equalization module, a sample rate conversion module, and a bass generation filter.

3. The programmable processor of claim 1, further comprising:
   an interface that is accessible by one or more instructions executed by the programmable micro-processor and is communicably coupled with the processor core.

4. The programmable processor of claim 1, the interface comprising at least one of:
   a user-defined or instruction-accessible input/output FIFO (first-in-first-out) interface to transmit the PDM output samples out of the processor core; and
   a direct memory access (DMA) interface communicably coupled to the processor core to transmit the PDM output samples out of the processor core.

5. The programmable processor of claim 3, further comprising:
   one or more PDM peripherals communicably coupled to the processor core through the interface to receive and perform one or more PDM peripheral tasks on the PDM output samples to generate PDM pulses for the input audio signal.

6. The programmable processor of claim 5, the one or more PDM peripherals comprising:

FIFO control logic stored in a non-transitory queue to retime the PDM output samples; and a pulse-width modulation counter or a bit-width reduction module to generate the PDM pulses for the input audio signal, wherein the pulse-width modulation counter or the bit-width reduction module is implemented as a firmware-driven module.

7. The programmable processor of claim 1, wherein the programmable micro-processor does not include a digital-analog converter or an application processor or application processor core to process the audio processing tasks on the input audio signal.

8. The programmable processor of claim 1, wherein functionality of the programmable micro-processor is dynamically changed by invoking a first firmware module in place of a second firmware module for the programmable processor.

9. The programmable processor of claim 1, wherein functionality of the programmable micro-processor is dynamically configured at a first time point after fabrication of the programmable processor by updating the firmware stored in the programmable processor, at a second time point when a source of the input audio signal when the source of the input audio signal is identified, and/or at a third time point when the programmable processor is receiving or processing the input audio signal by invoking or loading at least one of the one or more audio processing modules in the firmware.

10. The programmable processor of claim 1, wherein at least one of the one or more audio processing modules in the firmware includes one or more pieces of information that is identified or determined by co-optimizing the first audio processing module with one or more post-processing modules.

11. A machine implemented method for implementing a pulse-density modulation (PDM) intellectual property block, comprising:

receiving an audio signal as an input to a programmable micro-processor;

identifying a firmware stored upon a non-transitory machine readable storage medium residing in the programmable micro-processor; and performing audio processing tasks on the audio signal to generate pulse-density modulation (PDM) samples by using a processor core of the programmable micro-processor to execute at least one firmware module in the firmware in the programmable micro-processor, wherein the at least one firmware module in the firmware comprise one or more filters to improve harmonic content of the PDM samples.

12. The machine implemented method of claim 11, the process further comprising:

directly writing the PDM samples to one or more PDM peripherals;

programming the programmable micro-processor; and identifying the firmware stored in a non-transitory memory in the programmable micro-processor, wherein at least one of the audio processing tasks is performed by using a firmware module stored in the firmware.

13. The machine implemented method of claim 12, the act of customizing the programmable micro-processor comprising at least one of:

identifying a module for the programmable micro-processor;

configuring the programmable micro-processor with user-specified instructions or one or more user-provided modules; and co-optimizing at least a part of the processor core with the module for the programmable micro-processor.

14. The machine implemented method of claim 12, the act of co-optimizing at least a part of the processor core comprising at least one of:

identifying one or more optimization objectives;

identifying one or more firmware modules in the firmware in the programmable micro-processor;

identifying a library framework, one or more instructions, or one or more custom modules related to the one or more optimization objectives; and performing optimization by modifying the one or more firmware modules by using at least some of the library framework, the one or more instructions, or the one or more custom modules related to the one or more optimization objectives.

15. The machine implemented method of claim 12, the act of customizing the programmable micro-processor comprising at least one of:

configuring one or more firmware modules in a firmware of the programmable micro-processor to accommodate another programmable micro-processor or another processor core; and performing one or more post-fabrication corrections or fixes on the programmable micro-processor.

16. The machine implemented method of claim 11, the process further comprising:

dynamically invoking or loading at least one of one or more firmware modules or information related to the at least one of the one or more firmware modules based at least in part upon the audio signal.

17. The machine implemented method of claim 11, the process further comprising:

retiming the PDM samples by using a first PDM peripheral of the one or more PDM peripherals; and performing time proportioning on the PDM samples by using a second PDM peripheral of the one or more PDM peripherals.

18. The machine implemented method of claim 11, the act of performing the audio processing tasks comprising:

performing interpolation on the audio signal with one or more interpolators within the programmable micro-processor;

performing one or more pulse-density modulation tasks on the audio signal within the programmable micro-processor to generate PDM output signals; and generating the PDM samples by at least performing quantization on the PDM output signals within the programmable micro-processor.

19. The machine implemented method of claim 15, the act of performing the audio processing tasks further comprising at least one of:

performing sample rate conversion on the audio signal within the programmable micro-processor;

performing noise shaping on the audio signal within the programmable micro-processor to improve signal-to-noise ratio;

perform audio equalization on the audio signal within the programmable micro-processor to alter frequency responses of the audio signal; and perform audio mixing on the audio signal within the programmable micro-processor to combine multiple audio signals.

20. The machine implemented method of claim 11, further comprising at least one of:

enhancing data security of the audio signal;

reducing a requirement for a total number of cycles per unit time for the programmable micro-processor;

reducing a requirement for power consumption for the programmable micro-processor; and reducing a die size of the programmable micro-processor.

21. The machine implemented method of claim 11, further comprising:

transmitting the PDM samples from the processor core of the programmable micro-processor to memory for a first peripheral module via a core-to-peripheral interface;

retiming the PDM samples into uniform PDM duty cycle value samples using the first peripheral module;

transmitting the uniform PDM duty cycle value samples to a second peripheral module; and generating PDM pulses for the audio signal using the second peripheral module with a time proportioning module.

22. The machine implemented method of claim 11, the process further comprising:

dynamically invoking or loading the at least one firmware module or one or more other firmware modules or information related to the at least one firmware module or one or more other firmware modules based at least in part upon the audio signal.

23. The machine implemented method of claim 11, the process further comprising at least one of:

dynamically configuring the programmable micro-processor at a first time point after fabrication of the programmable processor by updating the firmware stored in the programmable micro-processor;

dynamically configuring the programmable micro-processor at a second time point when a source or one or more characteristics of the audio signal is identified; and dynamically configuring the programmable micro-processor at a third time point when the programmable micro-processor is receiving or processing the audio signal by invoking or loading the at least one firmware module or one or more other firmware modules.

24. A system for implementing a pulse-density modulation (PDM) intellectual property block, comprising:

a non-transitory machine readable storage medium on a semiconductor substrate and storing thereupon a firmware;

a programmable micro-processor that executes one or more instructions to:

receive an audio signal as an input to the programmable micro-processor;

identify the firmware stored in the non-transitory machine readable storage medium residing in the programmable micro-processor; and perform audio processing tasks on the audio signal to generate pulse-density modulation (PDM) samples by using a processor core of the programmable micro-processor to execute at least one firmware module in the firmware in the programmable processor, wherein the at least one firmware module in the firmware comprise one or more filters to improve harmonic content of the PDM samples.

25. The system of claim 24, wherein the programmable micro-processor is further to:

directly write the PDM samples to one or more PDM peripherals;

customize the at least one firmware module or one or more other firmware modules in the firmware of the programmable micro-processor; and identify the firmware stored in a non-transitory memory in the programmable micro-processor, wherein at least one of the audio processing tasks is performed by using the at least one firmware module stored in the firmware.

26. The system of claim 25, wherein the programmable micro-processor is further to:

identify a module for the programmable micro-processor;

configure the programmable micro-processor with user-specified instructions or one or more user-provided modules; or co-optimize at least a part of the processor core with the module for the programmable micro-processor.

27. The system of claim 26, wherein the programmable micro-processor that is to co-optimize at least a part of the processor core with the module is further to:

identify one or more optimization objectives;

identify one or more firmware modules in the firmware in the programmable micro-processor;

identify a library framework, one or more instructions, or one or more custom modules related to the one or more optimization objectives; and perform optimization by modifying the one or more firmware modules by using at least some of the library framework, the one or more instructions, or the one or more custom modules related to the one or more optimization objectives.

28. The system of claim 24, wherein the programmable micro-processor is further to:

perform interpolation on the audio signal with one or more interpolators within the programmable micro-processor;

perform one or more pulse-density modulation tasks on the audio signal within the programmable micro-processor to generate PDM output signals; and generate the PDM samples by at least performing quantization on the PDM output signals within the programmable micro-processor.

29. The system of claim 24, wherein the programmable micro-processor is further to:

enhance data security of the audio signal;

reduce a requirement for cycles per unit time for the programmable micro-processor;

reduce a requirement for power consumption for the programmable micro-processor; and reduce a die size of the programmable micro-processor.

30. The system of claim 29, wherein the programmable micro-processor is further to:

transmit the PDM samples from the processor core of the programmable micro-processor to memory for a first peripheral module via a core-to-peripheral interface;

retime the PDM samples into uniform PDM duty cycle value samples using the first peripheral module;

transmit the uniform PDM duty cycle value samples to a second peripheral module; and generate PDM pulses for the audio signal using the second peripheral module with a time proportioning module.

31. The system of claim 24, wherein the programmable micro-processor is further to:

dynamically invoke or load the at least one firmware module or one or more other firmware modules or information related to the at least one firmware module or one or more other firmware modules based at least in part upon the audio signal.

32. An article of manufacture comprising a non-transitory computer accessible storage medium having stored thereupon a sequence of instructions which, when executed by at least one programmable processor executing one or more threads, causes the at least one programmable processor to perform a method for implementing a pulse-density modulation (PDM) intellectual property block, the method comprising:

using the at least one programmable micro-processor to perform a process, the process comprising:

receiving an audio signal as an input to the at least one programmable micro-processor;

identifying a firmware stored upon a non-transitory machine readable storage medium residing in the at least one programmable micro-processor; and performing audio processing tasks on the audio signal to generate pulse-density modulation (PDM) samples by using a processor core of the programmable micro-processor to execute at least one firmware module in a firmware in the at least one programmable micro-processor, wherein the at least one firmware module in the firmware comprise one or more filters to improve harmonic content of the PDM samples.

33. The article of manufacture of claim 32, the process further comprising:

customizing the at least one programmable processor; and identifying the firmware stored in a non-transitory memory in the at least one programmable micro-processor, wherein at least one of the audio processing tasks is performed by using a firmware module stored in the firmware.

34. The article of manufacture of claim 33, the process further comprising:

directly writing the PDM samples to one or more PDM peripherals;

identifying a module for the at least one programmable micro-processor;

configuring the at least one programmable micro-processor with user-specified instructions or one or more user-provided modules; or co-optimizing at least a part of the processor core with the module for the at least one programmable micro-processor.

35. The article of manufacture of claim 34, the act of co-optimizing the at least a part of the processor core with the module further comprising:

identifying one or more optimization objectives;

identifying one or more firmware modules in the firmware in the at least one programmable micro-processor;

identifying a library framework, one or more instructions, or one or more custom modules related to the one or more optimization objectives; and performing optimization by modifying the one or more firmware modules by using at least some of the library framework, the one or more instructions, or the one or more custom modules related to the one or more optimization objectives.

36. The article of manufacture of claim 32, the process further comprising:

performing interpolation on the audio signal with one or more interpolators within the at least one programmable micro-processor;

performing one or more pulse-density modulation tasks on the audio signal within the at least one programmable micro-processor to generate PDM output signals; and generating the PDM samples by performing quantization on the PDM output signals within the at least one programmable micro-processor.

37. The article of manufacture of claim 32, the process further comprising:

enhancing data security of the audio signal;

reducing a requirement for cycles per unit time for the at least one programmable micro-processor;

reducing a requirement for power consumption for the at least one programmable processor; and reducing a die size of the at least one programmable micro-processor.

38. The article of manufacture of claim 32, the process further comprising:

transmitting the PDM samples from the processor core of the at least one programmable micro-processor to memory for a first peripheral module via a core-to-peripheral interface;

retiming the PDM samples into uniform PDM duty cycle value samples using the first peripheral module;

transmitting the uniform PDM duty cycle value samples to a second peripheral module; and generating PDM pulses for the audio signal using the second peripheral module with a time proportioning module.

* * * * *